United States Patent
Takahara et al.

(10) Patent No.: US 7,218,856 B2
(45) Date of Patent: May 15, 2007

(54) SYSTEM FOR COMPENSATING FOR CHROMATIC DISPERSION AND POLARIZATION MODE DISPERSION

(75) Inventors: Tomoo Takahara, Kawasaki (JP); Jens C. Rasmussen, Kawasaki (JP); Hiroki Ooi, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/949,889

(22) Filed: Sep. 27, 2004

(65) Prior Publication Data

US 2005/0078964 A1 Apr. 14, 2005

Related U.S. Application Data

(63) Continuation of application No. PCT/JP03/04004, filed on Mar. 28, 2003.

(30) Foreign Application Priority Data

Mar. 29, 2002 (JP) .............................. 2002-098073

(51) Int. Cl.
*H04J 14/02* (2006.01)
*H04B 10/18* (2006.01)

(52) U.S. Cl. .................. 398/81; 398/147; 398/159; 398/213

(58) Field of Classification Search ................ 398/81, 398/158–159, 147, 162, 209, 212–213
See application file for complete search history.

(56) References Cited

U.S. PATENT DOCUMENTS

| 6,710,904 B1 * | 3/2004 | Penninckx et al. ......... 398/111 |
| 6,728,491 B1 * | 4/2004 | Ooi et al. ................... 398/147 |
| 6,925,262 B2 * | 8/2005 | Ooi et al. ................... 398/147 |
| 2002/0015207 A1 | 2/2002 | Ooi et al. |
| 2002/0018267 A1 * | 2/2002 | Sun et al. ................... 359/161 |
| 2002/0044282 A1 * | 4/2002 | Moeller et al. ............. 356/369 |
| 2002/0149818 A1 * | 10/2002 | Tomofuji et al. ........... 359/124 |

FOREIGN PATENT DOCUMENTS

| EP | 1 130 827 | 5/2001 |
| JP | H07-221705 | 8/1995 |
| JP | H09-72827 | 3/1997 |

(Continued)

OTHER PUBLICATIONS

Khosravani, R.; Havstad, S.A.; Song, Y.W.; Ebrahimi, P.; Willner, A.E. "Polarization-Mode Dispersion Compensation in WDM Systems" Photonics Technology Letters, IEEE. vol. 13, Issue 12, Dec. 2001 pp. 1370-1372.*

(Continued)

*Primary Examiner*—Leslie Pascal
(74) *Attorney, Agent, or Firm*—Staas & Halsey LLP

(57) ABSTRACT

A transmitted optical signal is first subjected to polarization mode dispersion compensation by a polarization mode dispersion compensator (PMDC), and then, its chromatic dispersion is compensated by a variable chromatic dispersion compensator (VDC) after the polarization mode dispersion compensation. How much the optical transmission signal suffers from polarization mode dispersion, which is needed to perform the polarization mode dispersion is measured using a Stokes parameter that is not affected by chromatic dispersion.

22 Claims, 30 Drawing Sheets

FOREIGN PATENT DOCUMENTS

| | | |
|---|---|---|
| JP | WO-1999-028723 | * 10/1999 |
| JP | 2001-183541 | 7/2001 |
| JP | 2001-203637 | 7/2001 |
| JP | 2002-57622 | 2/2002 |

OTHER PUBLICATIONS

Shirasaki et al., "Variable Dispersion Compensator Using the Virtually Imaged Phased Array (VIA) for 40-Gbit/s WDM Transmission System", ECOC2000, PD Topic2, 2.3.

Horst et al., "Tunable Ring Resonator Dispersion Compensators Realized in High- Refractive Index Contrast Sion Technology" ECOC2000, PD Topics 2, 2.2.

Fells et al., "Twin Fibre Grating Adjustable Dispersion Compensator for 40GBIT/S", ECOC2000, PD Topic 2, 2.4.

Winters et al., "Optical Equalization of Polarization Dispersion" SPIE, vol. 1.1787, Multigigabit Fiber Communications, pp. 346-357.

Takahashi et al., "Automatic Compensation Technique for Timewise Fluctuating Polarization Mode Dispersion in In-line Amplifier Systems", Electronics Letters, vol. 30, No. 4, Feb. 1994, pp. 348-349.

Ono et al., "Polarization Control Method for Suppressing Polarization Mode Dispersion Influence in Optical Transmission Systems", Journal of Lightwave Technology, vol. 12, No. 5, May 1994, pp. 891-898.

Akiyama et al., "Automatic Dispersion Equalization in 40 Gbit/s Transmission by Seamless-Switching Between Multiple Signal Wavelengths", ECOC '99, Sep. 26-30, 1999, pp. 1-150-1-151.

Kawabata et al., "Representation and Measurement of the State of Polarization", 1977, pp. 109-117.

* cited by examiner

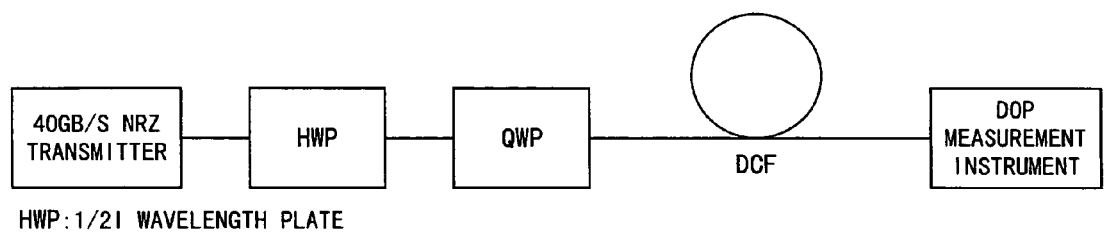
HWP: 1/2 λ WAVELENGTH PLATE
QWP: 1/4 λ WAVELENGTH PLATE
F I G. 5 A
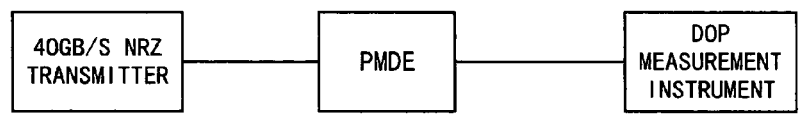
F I G. 5 B
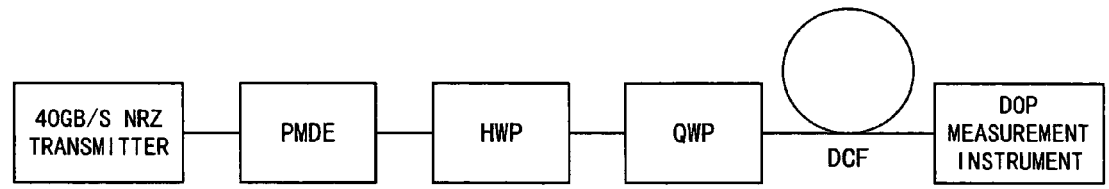
F I G. 5 C IN CASE THE CHROMATIC DISPERSION VALUE OF A DCF IS -407 ps/nm TABLE 1 DOP MEASUREMENT RESULT (CHROMATIC DISPERSION VALUE=−407 ps/nm)

| ITEM | ONLY DCF (%) FIG. 5A | PMDE SETTING VALUE (%) FIG. 5B | PMDE+DCF (%) FIG. 5C |
|---|---|---|---|
| 1 | 97.6−99.3 | 70.8 | 68.3−73.1 |
| 2 | DITTO | 80.8 | 78.7−83.0 |
| 3 | DITTO | 87.3 | 85.7−90.3 |

F I G. 6A

IN CASE THE CHROMATIC DISPERSION VALUE OF A DCF IS -700 ps/nm

TABLE 1 DOP MEASUREMENT RESULT (CHROMATIC DISPERSION VALUE=−700 ps/nm)

| ITEM | ONLY DCF (%) FIG. 5A | PMDE SETTING VALUE (%) FIG. 5B | PMDE+DCF (%) FIG. 5C |
|---|---|---|---|
| 1 | 98.1−99.7 | 70.0 | 68.7−71.5 |
| 2 | DITTO | 80.0 | 78.3−81.2 |
| 3 | DITTO | 90.5 | 88.9−91.9 |

F I G. 6B

IN CASE THE CHROMATIC DISPERSION VALUE OF A DCF IS -807 ps/nm

TABLE 1 DOP MEASUREMENT RESULT (CHROMATIC DISPERSION VALUE=−807 ps/nm)

| ITEM | ONLY DCF (%) FIG. 5A | PMDE SETTING VALUE (%) FIG. 5B | PMDE+DCF (%) FIG. 5C |
|---|---|---|---|
| 1 | 97.5−99.3 | 70.0 | 67.9−71.1 |
| 2 | DITTO | 82.3 | 81.0−83.5 |
| 3 | DITTO | 90.0 | 88.3−90.3 |

F I G. 6C

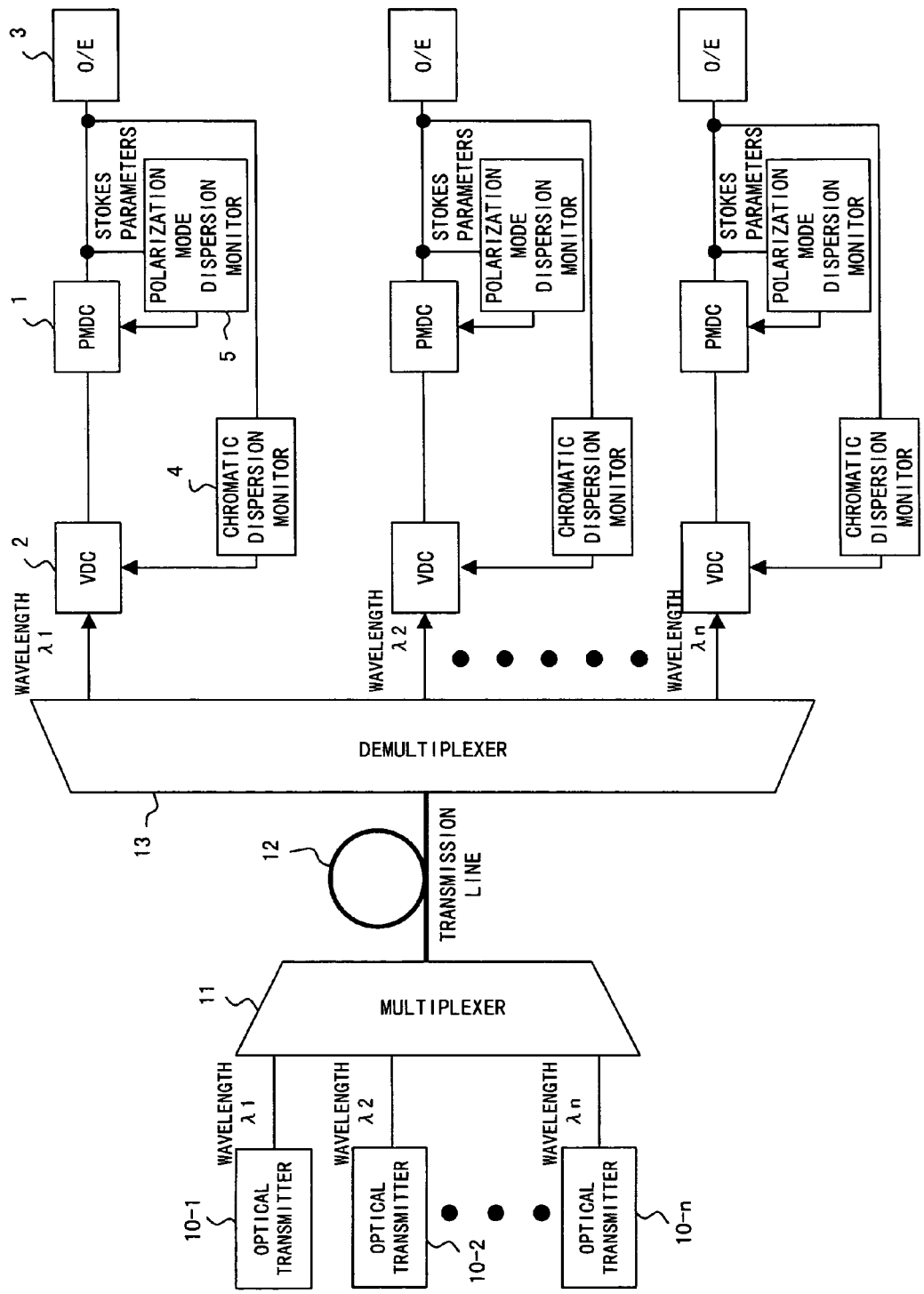
F I G. 9

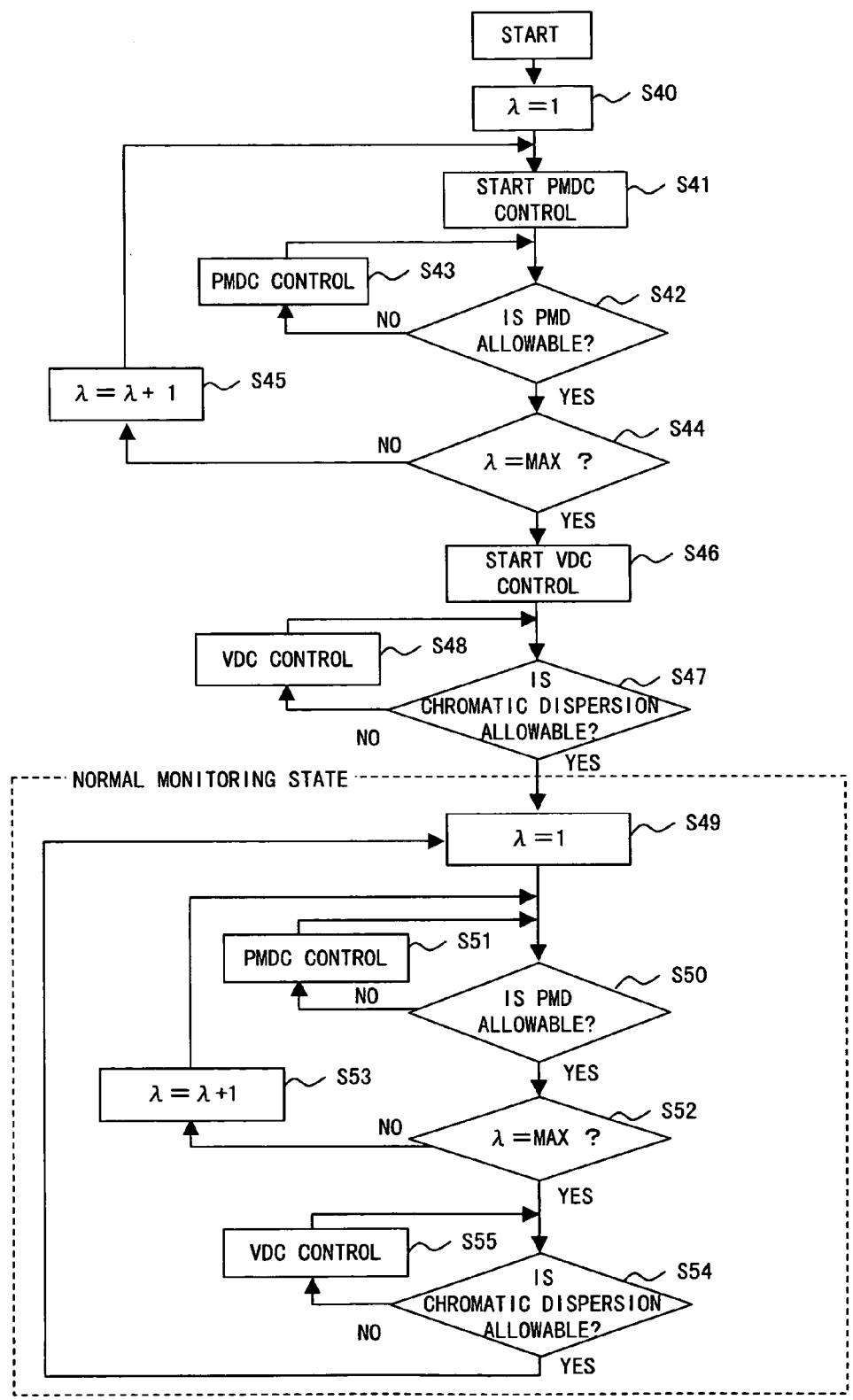
F I G. 19

SYSTEM FOR COMPENSATING FOR CHROMATIC DISPERSION AND POLARIZATION MODE DISPERSION

CROSS REFERENCE TO RELATED APPLICATION

This application is a continuation of an International Application No. PCT/JP03/04004, which was filed on Mar. 28, 2003.

BACKGROUND OF THE INVENTION

1. Field of the Invention

The present invention relates to both a chromatic dispersion compensation method and a polarization mode dispersion compensation method, which are essential to realize the current large capacity, high speed and long haul of an optical communication system. More particularly, the present invention relates to a system for optimally compensating for both chromatic dispersion and polarization mode dispersion in a super-high-speed single-wave or wavelength-division multiplex optical transmission system.

2. Description of the Related Art

With the recent rapid increase of network capacity, a far larger-capacity network is needed. Although currently a wavelength-division multiplex (WDM) optical transmission method based on the transmission capacity per channel of 10 Gb/s has been put into practical use, a far larger capacity will be needed in the future, and for the reasons of the use efficiency of a frequency and equipment cost, the realization of a high-speed optical transmission system with a capacity of 40 Gb/s per channel is expected.

However, since in such a super-high-speed optical transmission system, transmission waveform degradation due to both chromatic dispersion and polarization mode dispersion occurs, the transmission length of optical signals is restricted, which is a problem. Therefore, in order to realize such a super-high-speed optical transmission system, a system for compensating for both the chromatic dispersion and polarization mode dispersion with high accuracy is needed.

(I) About Chromatic Dispersion

Firstly, the summary of chromatic dispersion is described.

In an optical communication system with a transmission rate of 10 Gb/s or more, chromatic dispersion torelance remarkably decreases. For example, the chromatic dispersion tolerance of a 40 Gb/s NRZ (non-return-to-zero) signal is 100 ps/nm or less.

However, the repeater span of an optical communication system is not constant. Therefore, if 1.3 µm zero-dispersion single mode fiber (SMF) having a chromatic dispersion value of 17 ps/nm/km is used, the chromatic dispersion tolerance deviates if the repeater span differs only by several kilometers.

However, the distance of each repeater span and its chromatic dispersion value of an optical fiber transmission line possessed by a communication carrier are not accurately obtained, and it is often difficult to realize highly accurate chromatic dispersion compensation by a fixed chromatic dispersion compensation method using a DCF (dispersion compensation fiber) or the like.

Furthermore, since the chromatic dispersion value varies depending on fiber temperature, stress or the like as time elapses, it is necessary to optimally adjust the amount of chromatic dispersion of each repeater span by strictly measuring chromatic dispersion not only at the time of system operation commencement but also during the operation. For example, if the following conditions are assumed, Type of optical fiber: DCF
Length of transmission line: 500 km
Temperature fluctuations: 100° C.

$$\begin{aligned}[\text{Amount of chromatic dispersion}] &= [\text{Temperature dependency of zero}-\text{dispersion wavelength}] \times \\ &\quad [\text{Amount of temperature change}] \times \\ &\quad [\text{Dispersion slope of transmission line}] \times \\ &\quad [\text{Transmission distance}] \\ &= 0.03\,\text{nm}/°C. \times 100°\,C. \times \\ &\quad 0.07\,\text{ps}/\text{nm}^2/\text{km} \times 500\,\text{km} \\ &= 105\,\text{ps/nm}\end{aligned}$$

This value is almost equal to that of the chromatic dispersion tolerance of a 40 Gb/s NRZ signal. Therefore, an automatic chromatic dispersion compensation system for optimally controlling the amount of chromatic dispersion compensation is essential to not only a system using an SMF as a transmission line but also one using 1.55 zero-dispersion shift fiber (DSF) and NZ (non-zero)-DSF as a transmission line.

(II) About Polarization Mode Dispersion

Next, polarization mode dispersion (PMD) is described.

PMD is caused by a difference in propagation delay time between the polarization components (such as between a TE mode and a TM mode) of an optical signal, and is caused in an optical fiber.

Generally, the larger an optical signal is, the larger the influence of polarization mode dispersion becomes. The longer the transmission distance is, the larger the influence of polarization mode dispersion becomes. The influence cannot be neglected.

There is one with a large PMD value per unit length of 1 ps/km$^{1/2}$ (pico-second/km$^{1/2}$) (pico indicates $10^{-12}$) in optical fibers constituting an old optical transmission line mainly laid outside Japan. Even if a short-haul transmission (such as 50 km transmission) is conducted using such an optical fiber, optical differential delay (Δτ) is 7 ps or more against one time-slot 25 ps of a 40 Gb/s NRZ signal. Therefore, the influence of polarization mode dispersion cannot be neglected like the earlier-mentioned chromatic dispersion. In reality, since in an optical communication system, materials that cause polarization mode dispersion, such as an optical amplifier, a chromatic dispersion compensator and the like must be provided in a transmission line, there is a possibility that the transmission length of optical signals is further restricted. Furthermore, since polarization mode dispersion varies depending on stress applied to an optical fiber and temperature change as time elapses, the state of polarization mode dispersion in a transmission line must be monitored not only at the time of installation but also during its operation, and the polarization mode dispersionmust be dynamically compensated.

As described above, chromatic dispersion and polarization mode dispersion are major factors in limiting the performance of an optical communication system. Therefore, in order to improve the performance of the optical communication system, an automatic dispersion compensation system for independently and dynamically compensating for both chromatic dispersion and polarization mode dispersion must be prepared.

Device technologies for realizing the automatic dispersion compensator are grouped into the following three items (a) through (c).
(a) Realization of a variable chromatic dispersion compensator
(b) Realization of a transmission line dispersion monitor
(c) Realization of the feedback optimization control method of a variable chromatic dispersion compensator As a chromatic dispersion compensator in (a) above, the following ones are proposed as examples.

(1) VIPA (Virtually Imaged Phased Array)
"Variable Dispersion Compensator Using the Virtually Imaged Phased Array (VIPA) for 40 Gbit/s WDM Transmission Systems", ECOC2000, PD Topic 2, 2.3

(2) Tunable Ring Resonator
"Tunable Ring Resonator Dispersion Compensators Realized in High Refractive-index Contrast Technology" ECOC2000, PD topic 2, 2.2

(3) FBG (Fiber Bragg Grating)
"Twin Fiber Grating-Adjustable Dispersion Compensator for 40 Gbit/s" ECOC2000, PD Topic 2, 2.4

As the polarization mode dispersion compensator, the following ones are proposed as examples.
(1) A method for providing a polarization controller (PC) at an optical signal transmitting terminal, feeding back its transmission characteristic from its receiving terminal and controlling the branch ratio γ of its optical intensity to two polarization modes so as to be 0 or 1.

"Optical Equalization of Polarization Dispersion", SPIE Vol. 1. 1787 Multi-gigabit Fiber Communications, 1992, pp. 346-357
(2) A method for providing both a polarization controller and a polarization maintaining fiber (PMF) at an optical signal receiving terminal and giving a differential delay between two polarization modes with a sign the reversal of that of an optical transmission line by controlling the polarization controller.

"Automatic Compensation Technique for Timewise Fluctuating Polarization Mode Dispersion in In-line Amplifier Systems", Electro. Lett., Vol. 30, No. 4, 1994, pp. 348-349
(3) A method for providing a polarization controller, a polarization beam splitter, two light receivers receiving each of two demultiplexed optical signal components and a variable delay device giving a differential delay between two electrical signals obtained by these light receivers, and controlling both the polarization controller and variable delay device.

"Polarization Control Method for Suppressing Polarization Mode Dispersion Influence in Optical Transmission Systems", Journal of Ligthwave Technology, Vo. 12, No. 5, 1994, pp. 891-898

Next, as to the transmission line dispersion value monitor essential to the feedback/control in (b) above, several methods are proposed.

Firstly, as the measurement method of chromatic dispersion values, a pulse method and a phase method for inputting a plurality of segments of light each with a different wavelength and a group delay or a phase difference between a plurality of segments of output light has been conventionally proposed. However, in order to always conduct chromatic dispersion measurements without degrading communication quality during system operation, using these methods, (1) one set of chromatic dispersion measurement instruments are needed for each repeater span, and (2) wavelength-division multiplexing must be applied to a plurality of segments of measurement light each with a wavelength different from that of a data signal, which are problems. However, it is not practical from the viewpoints of economy and equipment size to realize these.

Several methods are proposed on a chromatic dispersion monitor used to solve such problems. Examples of such a chromatic dispersion monitoring methods are as follows.

(1) A Method Utilizing the Principal that the Intensity of a Specific Frequency Component Varies Due to Waveform Distortion and Using the Intensity of a Specific Frequency Component of a Received Baseband Signal
("Automatic Dispersion Equalization in 40 Gbit/s Transmission by Seamless Switching between Multiple Signal Wavelengths", ECOC' 99, pp. 1-150-151)

(2) A Method Using an Error Rate
In this method, an error rate is monitored by a receiver, and feedback/control is exercised over a chromatic dispersion compensator so that the error rate may become the best.

In any of practical dispersion monitors, waveform distortion due to dispersion is directly or indirectly used. If chromatic dispersion and polarization mode dispersion are simultaneously caused, it cannot be determined by which waveform distortion is caused, chromatic dispersion or polarization mode dispersion. Therefore, in this case, it is difficult to realize an automatic dispersion compensator for simultaneously compensating for both chromatic dispersion and polarization mode dispersion.

As the polarization mode dispersion measurement method, the following ones are proposed.
(1) Senarmont Method
(2) Rotary analyzer method
(3) Rotary phase-retarder method
(4) Phase Modulation method As the polarization state indication (expression) method, the following ones are proposed ("Indication Method and Measurement Method of Polarization State", OPTRONICS, No. 5 pp. 109-117 (1997)).
(1) Poincare sphere
(2) Jones vector
(3) Stokes vector As an example, a polarization mode dispersion measurement method using Jones vector and a device thereof is proposed by Japanese Patent Laid-open Application No. 9-72827. Although it is difficult to apply it in an environment where chromatic dispersion exists, a polarization mode dispersion monitor monitoring a specific frequency component in a received signal is also proposed (this applicant is now filing it for a patent).

SUMMARY OF THE INVENTION

It is an object of the present invention to provide a system capable of optimally compensating for both chromatic dispersion and polarization mode dispersion.

The system of the present invention is a communication system using an optical fiber as a transmission line. The system comprises a polarization mode dispersion compensation unit compensating for polarization mode dispersion from which an optical signal suffers when traveling through the optical fiber, a polarization mode dispersion measurement unit feeding back information about the state of polarization mode dispersion from which the optical signal suffers, to the polarization mode dispersion compensation unit, a chromatic dispersion compensation unit compensating for chromatic dispersion from which the optical signal suffers when traveling through the optical fiber, and a chromatic dispersion measurement unit provided closer to the receiver side than the polarization mode dispersion compensation unit, feeding back information about the state of chromatic dispersion from which the optical signal suffers, to the chromatic dispersion compensation unit.

According to the present invention, since a chromatic dispersion measurement point at which chromatic dispersion to be compensated is measured is disposed after the polarization mode dispersion compensation unit, chromatic dispersion after polarization mode dispersion is compensated can be measured. Since polarization mode dispersion can be accurately measured regardless of the amount of chromatic dispersion, first, polarization mode dispersion is compensated, chromatic dispersion after the polarization mode dispersion is compensated is measured, and chromatic dispersion is compensated, based on this measurement result. Therefore, both polarization mode dispersion and chromatic dispersion can be optimally compensated.

BRIEF DESCRIPTION OF THE DRAWINGS

FIGS. 5A, 5B and 5C explain the effectiveness of Stokes parameters as a polarization mode dispersion measurement parameter (No. 1);

FIGS. 6A, 6B and 6C explain the effectiveness of a Stokes parameter as a polarization mode dispersion measurement parameter (No. 2);

FIG. 9 shows the configuration of the sixth preferred embodiment of the present invention;

FIG. 19 is a flowchart showing the control process of the eighth preferred embodiment.

DESCRIPTION OF THE PREFERRED EMBODIMENTS

It is an object of the present invention to provide an automatic dispersion compensation system provided with both an automatic chromatic dispersion compensator and an automatic polarization mode dispersion compensator optimally feeding back and controlling chromatic dispersion and polarization mode dispersion, respectively.

Figure 1:
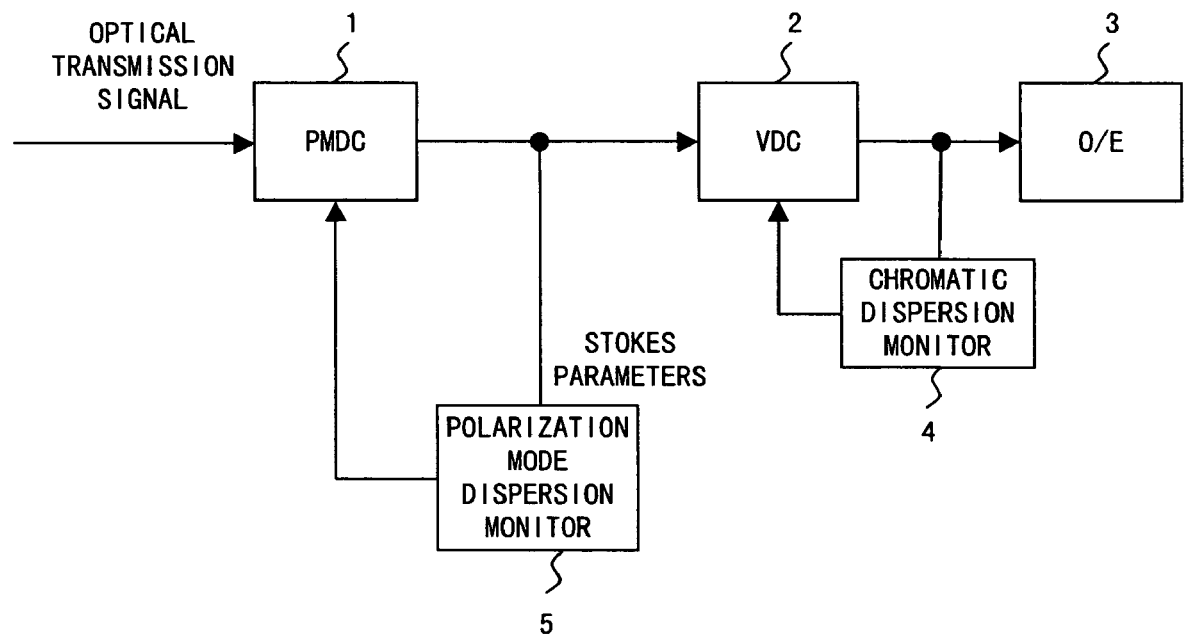
FIG. 1 is a block diagram showing the basic configuration of the preferred embodiment of the present invention.
Figure 2:
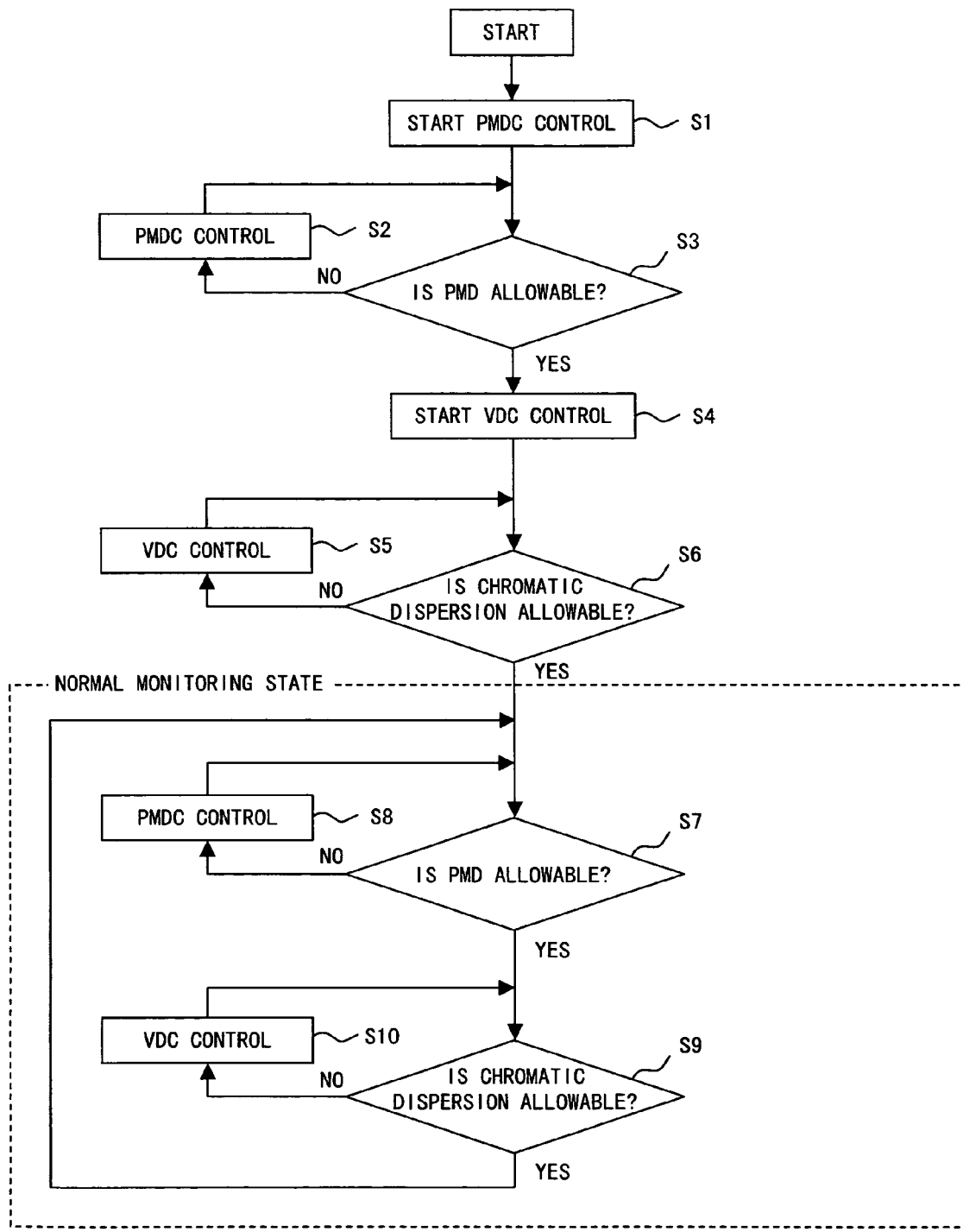
FIG. 2 is a flowchart showing a control algorithm needed for the configuration shown in FIG. 1.

FIG. 1 is a block diagram showing the basic configuration of the preferred embodiment of the present invention. FIG. 2 is a flowchart showing a control algorithm needed in the configuration shown in FIG. 1.

In FIG. 1, a variable chromatic dispersion compensator 2 is provided next to a polarization mode dispersion compensator 1, and the optical/electrical converter 3 is provided next to the variable chromatic dispersion compensator. A polarization mode dispersion monitor 5 monitors the output of the polarization mode dispersion compensator 1 and feeds back the information to the polarization mode dispersion compensator 1. A chromatic dispersion monitor 4 monitors the output of the variable chromatic dispersion compensator 2 and feeds back the information to the variable chromatic dispersion compensator 2. The chromatic dispersion monitor is essential to the feedback/control of the automatic chromatic dispersion compensator. However, the practical chromatic dispersion monitoring methods proposed so far have weak anti-polarization-mode-dispersion as follows.

(1) Specific Frequency Extraction Method

As seen from the fact that the same proposal is also made as a polarization mode dispersion monitor, it cannot be determined by the fluctuations whether the relevant dispersion is caused by polarization mode dispersion or chromatic dispersion. In other words, its anti-polarization-mode-dispersion is weak.

(2) Method Using an Error Rate

The fluctuations of an error rate are caused not only by chromatic dispersion but also polarization mode dispersion. Therefore, it cannot be determined by the fluctuations of which the relevant dispersion is caused, by polarization mode dispersion or chromatic dispersion. In other words, its anti-polarization-mode-dispersion is weak.

Therefore, the feedback/control of the variable chromatic dispersion compensator must be made based on information about chromatic dispersion monitored in a state where polarization mode dispersion is stable.

For this reason, in this preferred embodiment of the present invention, as shown in FIG. 1, the polarization mode dispersion compensator (PMDC) is disposed before the variable chromatic dispersion compensator (VDC).

By disposing the automatic chromatic dispersion compensator after the polarization mode dispersion compensator, waveform distortion due to polarization mode dispersion can be eliminated from transmission signals inputted to the automatic chromatic dispersion compensator.

However, since it is presumed that chromatic dispersion compensation should be made after polarization mode dispersion compensation, chromatic dispersion compensation must be always made in a state where a polarization mode dispersion value is sufficiently compensated and is stable. Therefore, the control shown in the flowchart of FIG. 2 is necessary.

According to FIG. 2, if both a polarization mode dispersion compensator and an automatic chromatic dispersion compensator are started for the first time, firstly in step S1, the control of the polarization mode dispersion compensator (PMDC) is started. Then, in step S3, it is determined whether the PMD is within its allowable range. If it is determined that the PMD is not within the allowable range, in step S2, PMDC control is performed. If in step S3 it is determined that the PMD is out of the allowable range, the process proceeds to step S4.

In step S4, the control of the automatic variable chromatic dispersion compensator (VDC) is started. Then, in step S6 it is determined whether the chromatic dispersion is within its allowable range. If it is determined that the chromatic dispersion is out of the allowable range, in step S5 VDC control is performed. If it is determined that the chromatic dispersion is within the allowable range, the process proceeds to step S7, and the automatic variable chromatic dispersion compensator enters a normal monitoring state.

In step S7, it is determined whether the PMD is within the allowable range. If it is determined that the PMD is within the allowable range, the process proceeds to step S9. If in step S7 it is determined that the PMD is out of the allowable range, in step S8 PMDC control is performed, and the process returns to step S7. In step S7, the control is repeated until the PMD becomes settled within the allowable range.

In step S9, it is determined whether chromatic dispersion is within the allowable range. If it is determined that the chromatic dispersion is out of the allowable range, in step S10 VDC control is performed, and the process returns to step S9. In step S9, the control is repeated until the chromatic dispersion becomes settled within the allowable range. If it is determined that the chromatic dispersion is within the allowable range, the process returns to step S7, and normal monitoring/control is continued.

Although in this preferred embodiment, polarization mode dispersion compensation is first made and then chromatic dispersion compensation is made, as shown in another preferred embodiment later, the same effect can be obtained only if the polarization mode dispersion compensator (PMDC) is disposed before the chromatic dispersion monitor, even when the disposition order of the compensators is reversed. In other words, it is sufficient if the chromatic dispersion monitor observes dispersion after polarization mode dispersion is compensated. Therefore, the observation point of the chromatic dispersion monitor is disposed after the polarization mode dispersion compensator (PMDC).

Furthermore, in this preferred embodiment of the present invention, it is proposed that a Stokes parameter is used as a polarization mode dispersion monitor value.

Figure 3:
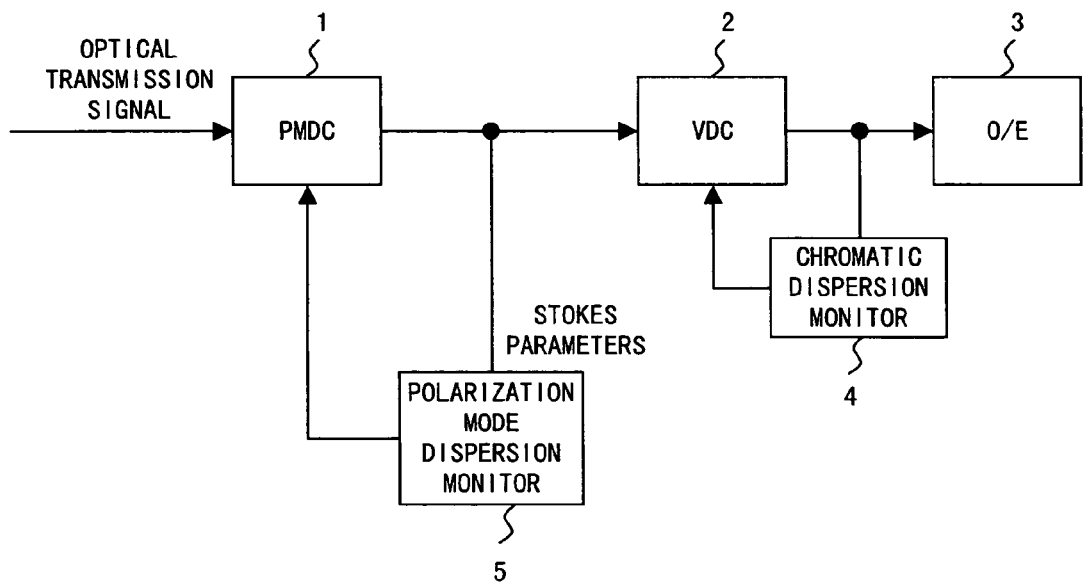
FIG. 3 is a block diagram showing the configuration of the second preferred embodiment of the present invention.

FIG. 3 is a block diagram showing the configuration of the second preferred embodiment of the present invention.

In FIG. 3, the same reference numerals as those in FIG. 1 are attached to the same components, and their descriptions are omitted. However, in FIG. 3, the polarization mode dispersion monitor 5 monitors a Stokes parameter. The Stokes parameter can monitor a polarization mode dispersion state without depending on the chromatic dispersion state of a transmission line.

PMDC 1 (polarization mode dispersion compensator) inserted before is fed back/controlled to an optimal polarization mode dispersion value, according to polarization mode dispersion information monitored by the Stokes parameter. Since transmission signals whose polarization mode dispersion is compensated is inputted to a VDC (variable chromatic dispersion compensator) 2, accurate chromatic dispersion information can be monitored regardless of the degree of the anti-polarization-mode-dispersion of the chromatic dispersion monitor 4, and accordingly, the variable chromatic dispersion compensator 2 can be fed back/controlled to an optimal chromatic dispersion value.

Thus, an automatic dispersion compensation system capable of simultaneously compensating for both polarization mode dispersion and chromatic dispersion can be provided.

Figure 4:
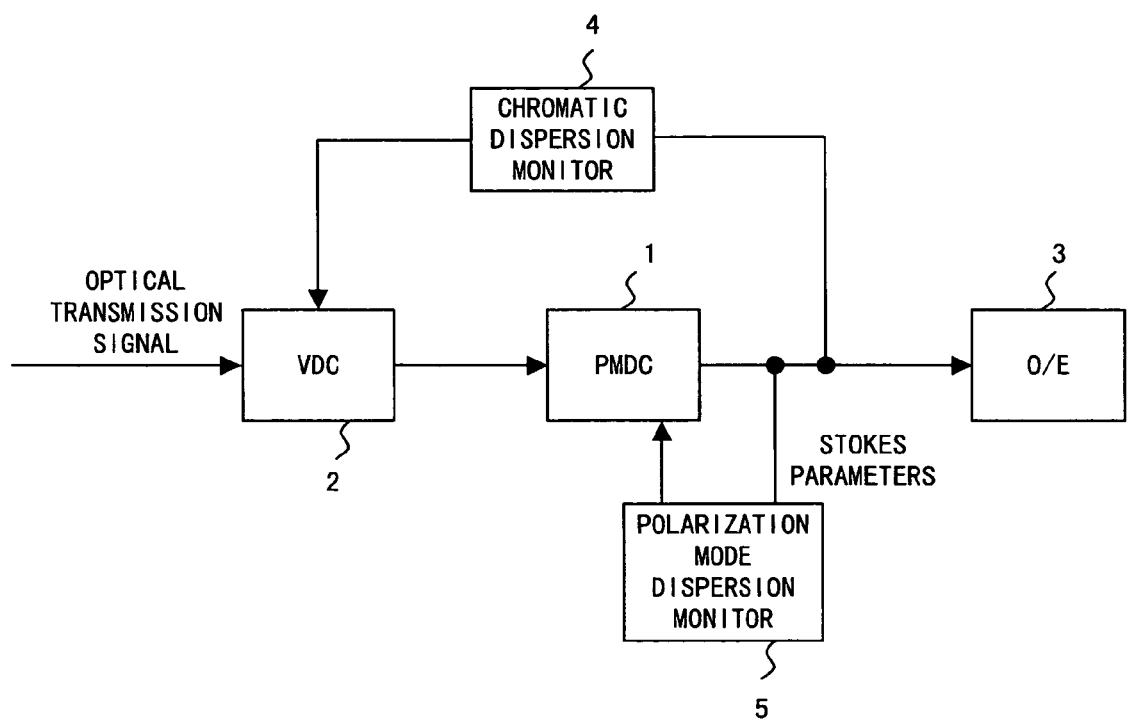
FIG. 4 is a block diagram showing the configuration of the third preferred embodiment of the present invention.

FIG. 4 is a block diagram showing the configuration of the third preferred embodiment of the present invention.

In FIG. 4, the same reference numerals as those in FIG. 1 are attached to the same components, and their descriptions are omitted.

In the above-mentioned preferred embodiments, since transmission signals whose polarization mode dispersion is compensated are inputted to the chromatic dispersion compensator, the disposition order of the polarization mode dispersion compensator and chromatic dispersion compensator is restricted. This preferred embodiment is proposed as this countermeasure.

By monitoring chromatic dispersion using the output of the polarization mode dispersion compensator 1 regardless of the deposition order of the chromatic dispersion compensator 2 and polarization mode dispersion compensator 1, chromatic dispersion whose influence due to polarization mode dispersion is eliminated can be monitored.

In the cases shown in FIGS. 3 and 4, the process shown in the flowchart of FIG. 2 is necessary. Since the flowchart shown in FIG. 2 has been described, its description is omitted here.

FIGS. 5A, 5B, 5C, 6A, 6B and 6C explain the effectiveness of a Stokes parameter as a measurement parameter for polarization mode dispersion.

Here, the definition of a Stokes parameter is described.

Light is an electromagnetic wave, and is a transversal wave whose electrical vector vibrates perpendicular to the travel direction of light. In this example, it is assumed that two orthogonal electrical vectors on a plane perpendicular to the travel direction of light are as follows.

$$Eu = Au \cdot \sin(\omega t + \delta u)$$

$$EV = AV \cdot \sin(\omega t + \delta v) \tag{1}$$

In this equation, Eu and Ev are two orthogonal electrical vector components, and Au and Av values that indicate the amplitude of an electrical vector and do not depend on time. ω is each number of vibrations, and δu and δv are the phases of the orthogonal components.

Generally, a Stokes parameter can be defined as follows using two orthogonal light components Eu and Ev.

$$S0 = <Eu \cdot Eu^* + Ev \cdot EV^*>$$

$$S1 = <Eu \cdot Eu^* - Ev \cdot EV^*>$$

$$S2 = <Eu^* \cdot Ev + Eu \cdot EV^*>$$

$$S4 = <Eu^* \cdot Ev + Eu \cdot EV^*> \quad (2)$$

In the above equations, * indicates complex conjugate, and < . . . > indicates a time average. In this example, since an electrical vector is indicated by a real number, its complex conjugate also becomes the same electrical vector component. Each of four segments of amount S0 through S3 has an intensity dimension, and each of S1, S2 and S3 is positive, negative or 0.

The Stokes parameter defined thus is hardly affected by chromatic dispersion, and can indicate a polarization state.

Means for obtaining S0, S1, S2 and S3 are specifically described below.

S0 can be obtained by directly detecting one of four segments of light obtained by splitting input light by a beam splitter.

S1 can be obtained by providing a polarizer with an axis in a position set in the angle of 90 degrees or 0 degree against a predetermined axis of one of the four segments of light obtained by splitting input light by the beam splitter and detecting the output of the polarizer.

S2 can be obtained by providing a polarizer with an axis in a position set in the angle of 45 or 125 degrees against a predetermined axis of one of the four segments of light obtained by splitting input light by the beam splitter and detecting the output of the polarizer.

S3 can be obtained by inputting one of the four segments of light obtained by splitting input light by the beam splitter to an λ/4 plate with an axis c in a position set in an angle of 90 degrees or 0 degree against the predetermined axis, providing a polarizer with the same axis as that of the polarizer of the output from the λ/4 plate and detecting the output of the polarizer.

Alternatively, S0, S1, S2 and S3 can be obtained by rotating a polarizer in an angle of 2π/n against light to be detected and measuring the light n times.

Furthermore, S0, S1, S2 and S3 can also be obtained by rotating a phase-retarder in an angle of 2π/n against light to be detected and measuring the light through a fixed polarizer.

FIGS. 5A, 5B and 5C show the setting of the effectiveness confirmation experiment for a PMD monitor using a Stokes parameter at the time of dispersion fluctuation.

Specifically, it is checked whether DOP (degree of polarization) can be stably measured even when in order to realize the simultaneous compensation of chromatic dispersion and polarization mode dispersion (PMD), a chromatic dispersion value in a transmission line is changed as a test for verifying the operation performed using a Stokes parameter as a method for stably monitoring PMD without depending on a chromatic dispersion state.

FIG. 5A shows a DOP measurement system for only chromatic dispersion, and in the system, a DCF is used to cause chromatic dispersion. In this example, a polarization state is controlled using both a ½-wavelength plate and a ¼-wavelength plate.

FIG. 5B shows a DOP measurement system for only polarization mode dispersion, and in the system, a PMDE (polarization mode dispersion emulator) is used to cause polarization mode dispersion.

FIG. 5C shows a DOP measurement system for both polarization mode dispersion and chromatic dispersion, and the system is built by combining the systems shown in FIGS. 5A and 5B.

In these systems, a 40 Gb/s NRZ transmitter and a DOP measurement instrument defined by a Stokes parameter are used as transmitting and receiving systems, respectively. DOP is defined as follows.

$$DOP = \sqrt{(S1^2 + S2^2 + S3^2)}/S0$$

FIGS. 6A, 6B and 6C show the DOP measurement result of the measurement system shown in FIGS. 5A, 5B and 5C.

In FIG. 6A, the chromatic dispersion value of a DCF is set to −407 ps/nm, and FIG. 6A shows DOP measurement results (%) in FIGS. 5A through 5C. The closer to 100% a DOP value, the more stable its polarization state. Items 1 through 3 shown in FIGS. 6A through 6C show the DOP measurement results in the cases where a PMDE polarization dispersion value is set to approximately 70, 80 and 90%, respectively.

In FIGS. 6A through 6C, in the cases of only a DCF, DOP values are approximately 100%, since no PMDE is not provided. In this case, if DOP is actually measured, it should be recognized that there is always approximately 10% of an error even when almost no polarization dispersion exists.

Next, in the case where a PMDE is provided in FIGS. 6A through 6C, the measured values of items 1 through 3 are approximately 70, 80 and 90%, respectively.

Next, DOP values in items 1 through 3 of the measurement results shown in FIGS. 6A through 6C, of the experiment system shown in FIG. 5C are 70, 80 and 90%, respectively, within an error range of approximately 10% regardless of the chromatic dispersion state of a DCF.

It can be confirmed that a polarization mode dispersion monitor using a Stokes parameter is excellent in an anti-chromatic dispersion characteristic and is effective as a polarization mode distribution monitor regardless of a chromatic dispersion state, based on these experiment results.

Figure 7:
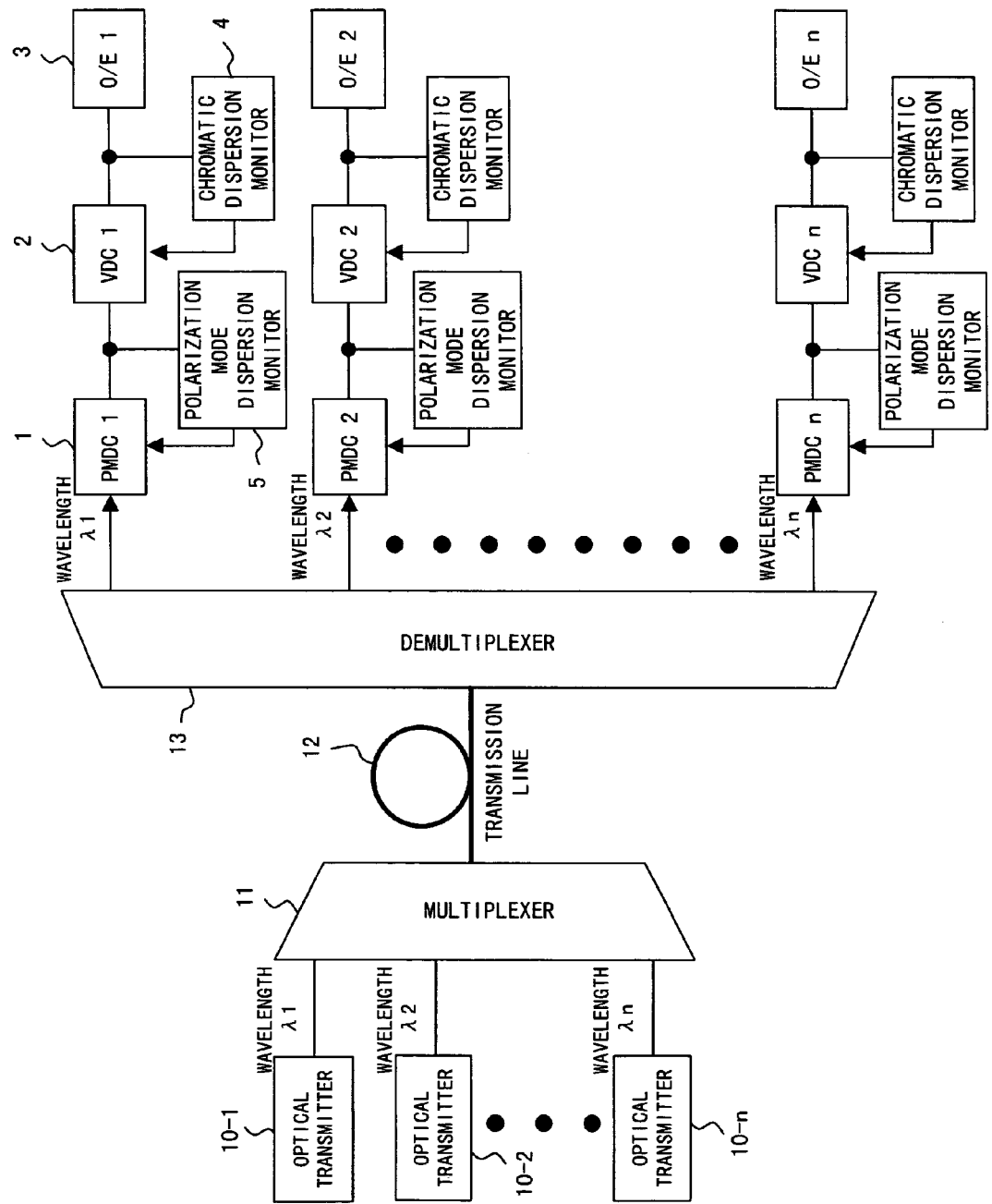
FIG. 7 shows the configuration of the fourth preferred embodiment of the present invention.

FIG. 7 shows the configuration of the fourth preferred embodiment of the present invention.

FIG. 7 shows a configuration for realizing an automatic dispersion compensation system provided with both an automatic chromatic dispersion compensator and an automatic polarization mode dispersion compensator.

In this preferred embodiment, an automatic dispersion compensator can be realized in a wavelength-division multiplex system by individually disposing the automatic dispersion compensator of the first preferred embodiment for each wavelength demultiplexed by a demultiplxer and individually compensating for its dispersion.

In this example, symbols λ1~λn indicate different wavelengths, and do not indicate a specific disposition order of the wavelengths of signal light contained in real wavelength-division multiplex light.

In the configuration shown in FIG. 7, optical signals transmitted from optical transmitters 10-1~10-n, each with one of wavelengths λ1~λn are multiplexed by a multiplexer 11 into a wavelength-division multiplex light and are inputted to the demultiplexer 13 of a receiver through a transmission line 12. Then, the wavelength-division multiplex light is demultiplexed into optical signals each with one of wavelengths λ1~λn by the demultiplexer 13. Then, when passing through PMDC1~n and VDC1~n, the polarization mode dispersion and chromatic dispersion, respectively, of the signals are compensated, as described above, and the signals are received by O/E1~n.

Figure 8:
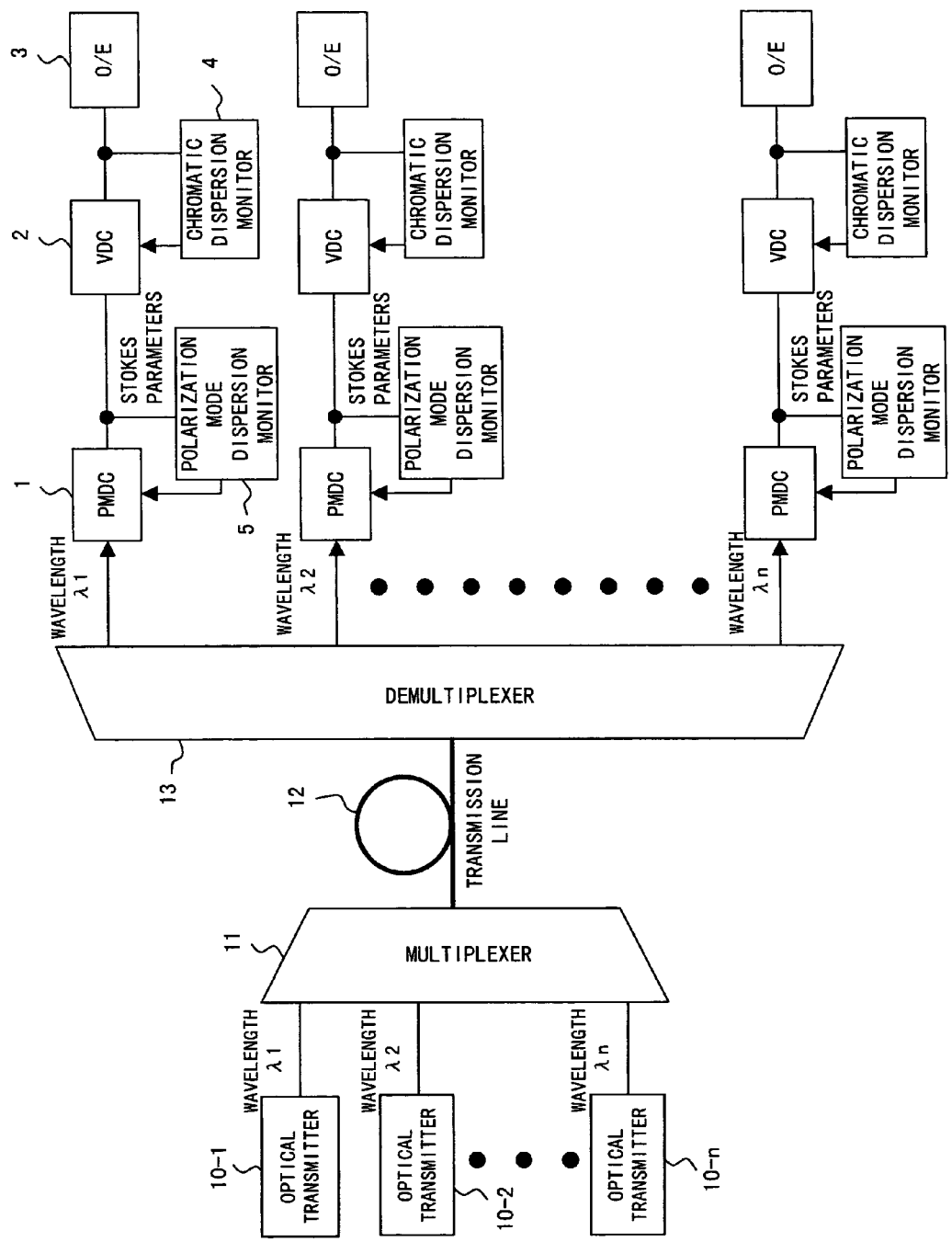
FIG. 8 shows the configuration of the fifth preferred embodiment of the present invention.

FIG. 8 shows the configuration of the fifth preferred embodiment of the present invention. In FIG. 8, the same reference numerals as those of FIG. 7 are attached to the same components, and their descriptions are omitted.

In this preferred embodiment, a Stokes parameter is used as the monitor value of a polarization mode dispersion mode monitor in the fourth preferred embodiment. As described above, since a Stokes parameter can monitor a polarization state regardless of a chromatic dispersion state, the influence of polarization mode dispersion can be extracted from the mixture of chromatic dispersion and polarization mode dispersion, and polarization mode dispersion can be appropriately compensated. Then, both polarization mode dispersion and chromatic dispersion can be appropriately compensated by detecting the state after such polarization mode dispersion is compensated, and applying chromatic dispersion compensation.

Since the remaining configuration is the same as that of FIG. 7, its description is omitted.

FIG. 9 shows the configuration of the sixth preferred embodiment of the present invention.

In FIG. 9, the same reference numerals as those of FIG. 7 are attached to the same components, and their descriptions are omitted.

By individually disposing the automatic dispersion compensator proposed in FIG. 4 for each wavelength demultiplexed by a demultiplexer and individually compensating for dispersion, an automatic dispersion compensator can be realized in a wavelength-division multiplex communication system, regardless of the disposition order of a chromatic dispersion compensator and a polarization mode dispersion compensator.

In other words, this preferred embodiment can be obtained by adopting the respective configurations of the polarization mode dispersion compensator and chromatic dispersion compensator that are shown in FIG. 4 in the fourth or fifth preferred embodiment.

As described earlier, although a chromatic dispersion monitor cannot distinguish dispersion due to polarization mode dispersion from dispersion due to chromatic dispersion, a polarization mode dispersion monitor can eliminate the influence of polarization mode dispersion. Therefore, the observation point of the chromatic dispersion monitor is disposed after a polarization mode dispersion compensator (PMDC), signals whose polarization mode dispersion is compensated can be observed. Therefore, each of chromatic dispersion and polarization mode dispersion can be appropriately compensated. According to such an opinion, although a variable chromatic dispersion compensator (VDC) is disposed closer to a transmitter than a polarization mode dispersion compensator (PMDC)(before a PMDC), the observation point of the chromatic dispersion monitor is disposed after the polarization mode dispersion compensator (closer than a receiver).

Since the remaining configuration is the same as that of FIG. 8, its description is omitted.

FIGS. 10 through 15 show examples of the seventh preferred embodiment of the present invention.

In FIGS. 10 through 15, the same reference numerals as those of FIG. 7 are attached to the same components, and their descriptions are omitted.

In the automatic dispersion compensation system for individually compensating for chromatic dispersion for each wavelength shown in FIGS. 7 through 9, cost and size loads are heavy since chromatic dispersion compensators for the number of multiplexed wavelengths (combination of a polarization mode dispersion compensator and a chromatic dispersion compensator) are needed. In order to solve this problem, a chromatic dispersion compensator by which the entire wavelength-division multiplex light is compensated must be adopted.

Figure 10:
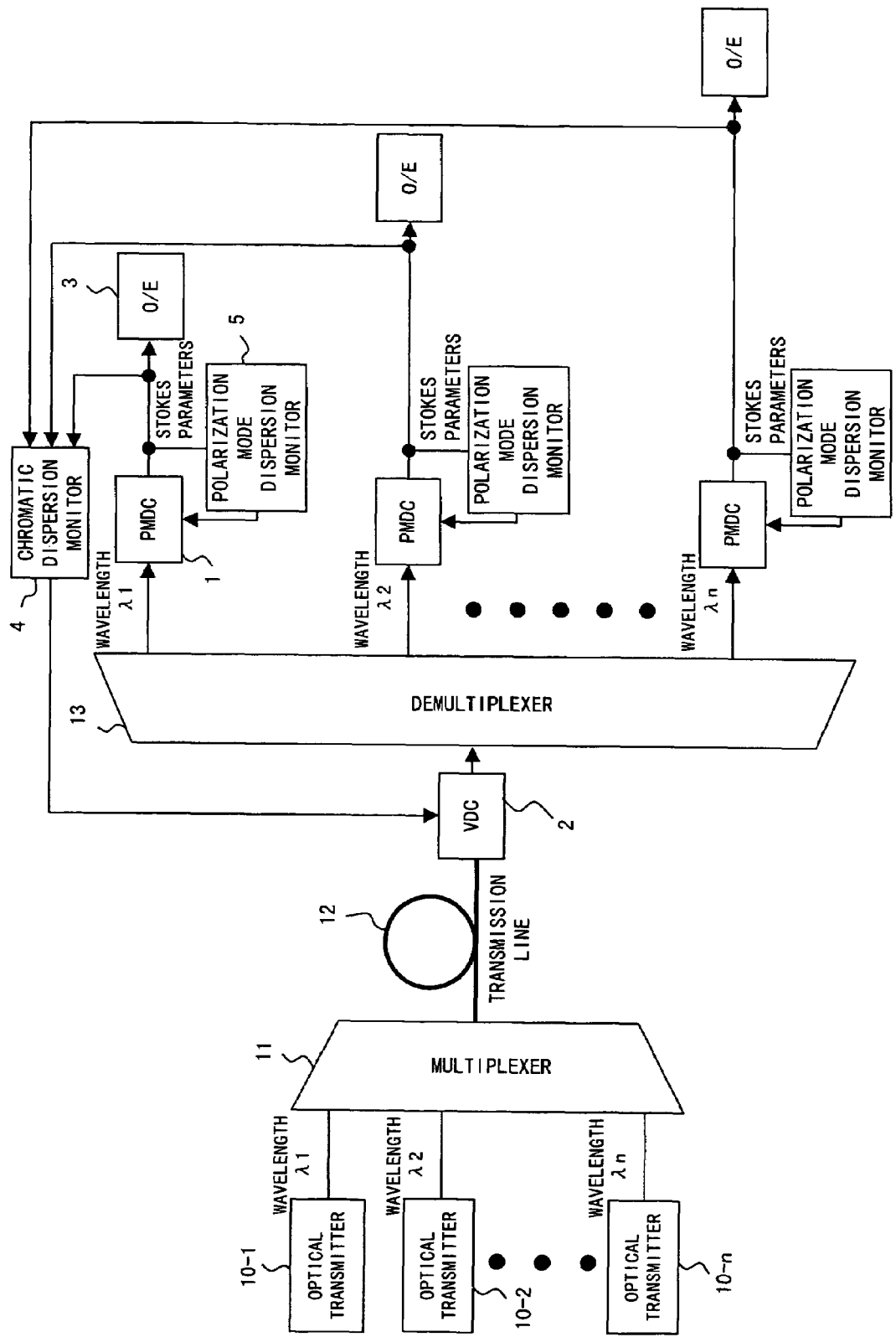
FIG. 10 shows one example of the seventh preferred embodiment of the present invention (No. 1)
Figure 11:
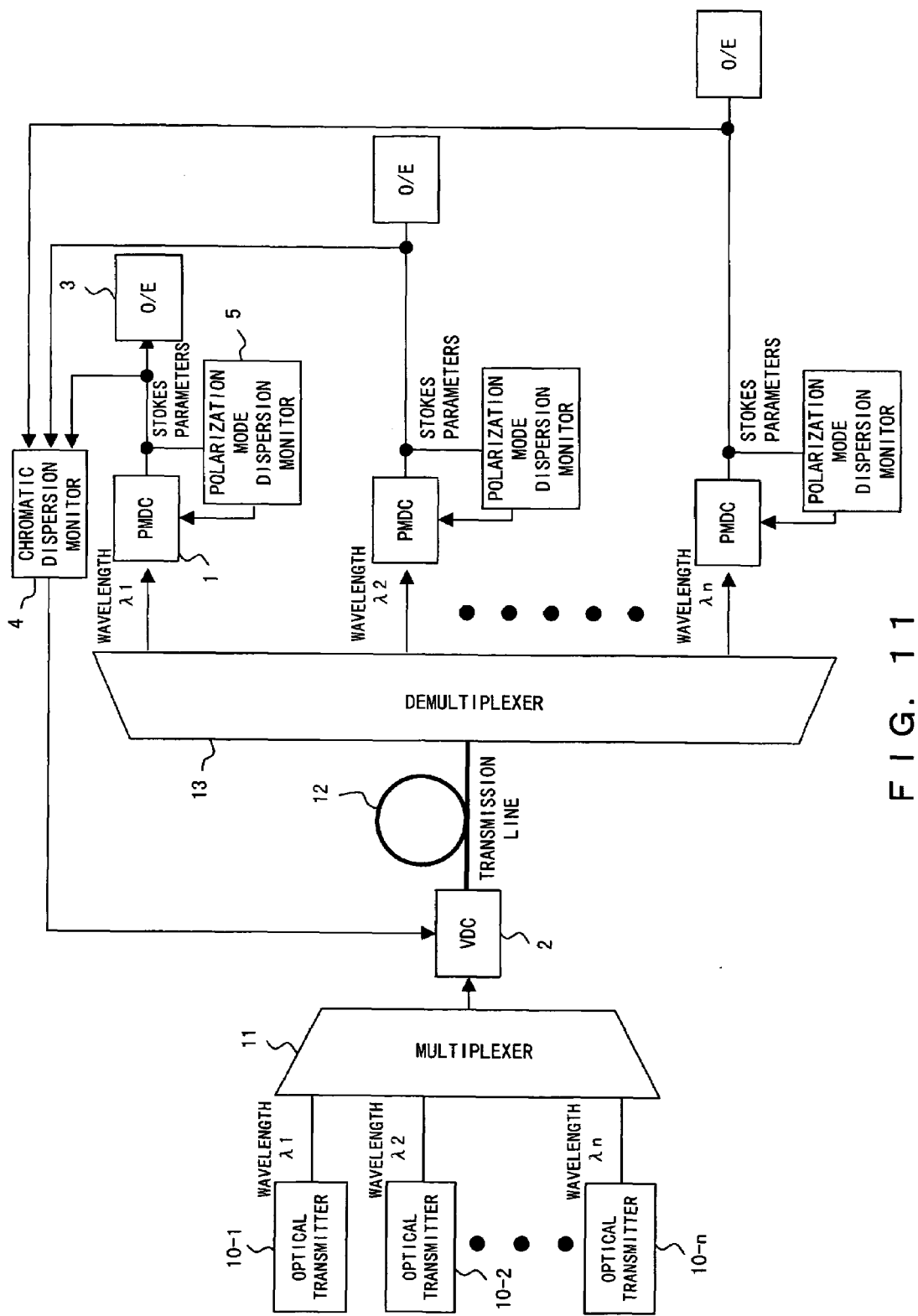
FIG. 11 shows another example of the seventh preferred embodiment of the present invention (No. 2)
Figure 12:
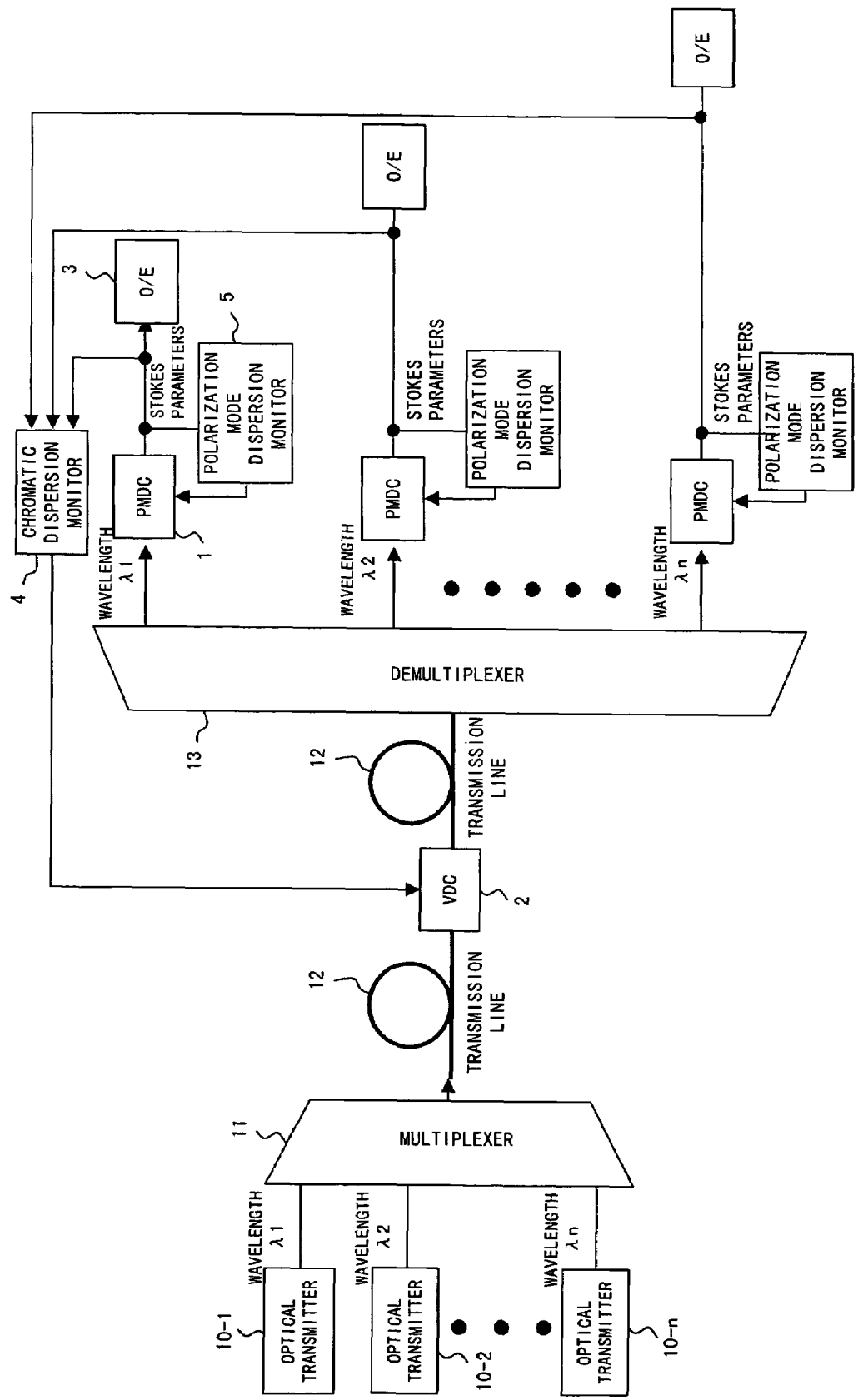
FIG. 12 shows another example of the seventh preferred embodiment of the present invention (No. 3)

In FIGS. 10 through 12, an automatic dispersion compensation system can be realized by providing both a variable chromatic dispersion compensator collectively compensating for the chromatic dispersion of the entire wavelength-division multiplex signal in one or more places of the receiving terminal of a transmission line or a receiver (see FIG. 10), the transmitting terminal of a transmission line or a transmitter (FIG. 11) and a repeater or an independent place in the middle of a transmission line (FIG. 12), and a polarization mode dispersion compensator individually compensating for polarization mode dispersion for each wavelength demultiplexed by a demultiplexer and feedback-controlling the variable chromatic dispersion compensator, using the outputs of one or more polarization mode dispersion compensators as chromatic dispersion monitors.

Although in FIGS. 10 through 12, the chromatic dispersion of optical signals with all wavelengths after being demultiplexed by a demultiplexer are monitored and the variable chromatic dispersion compensator (VDC) is controlled using this, as described above, it is not always necessary to monitor the respective chromatic dispersion of all optical signals. In other words, the most of a chromatic dispersion mechanism is currently clarified, and if the characteristic of an optical fiber used as a transmission line is known, what chromatic dispersion is caused can be predicted to some extent. Therefore, if the chromatic dispersion of only one optical signal is measured, from what chromatic dispersion the optical signals in the other channels suffer can be estimated based on this value with some high accuracy, and accordingly, chromatic dispersion can be sufficiently compensated using this.

Figure 13:
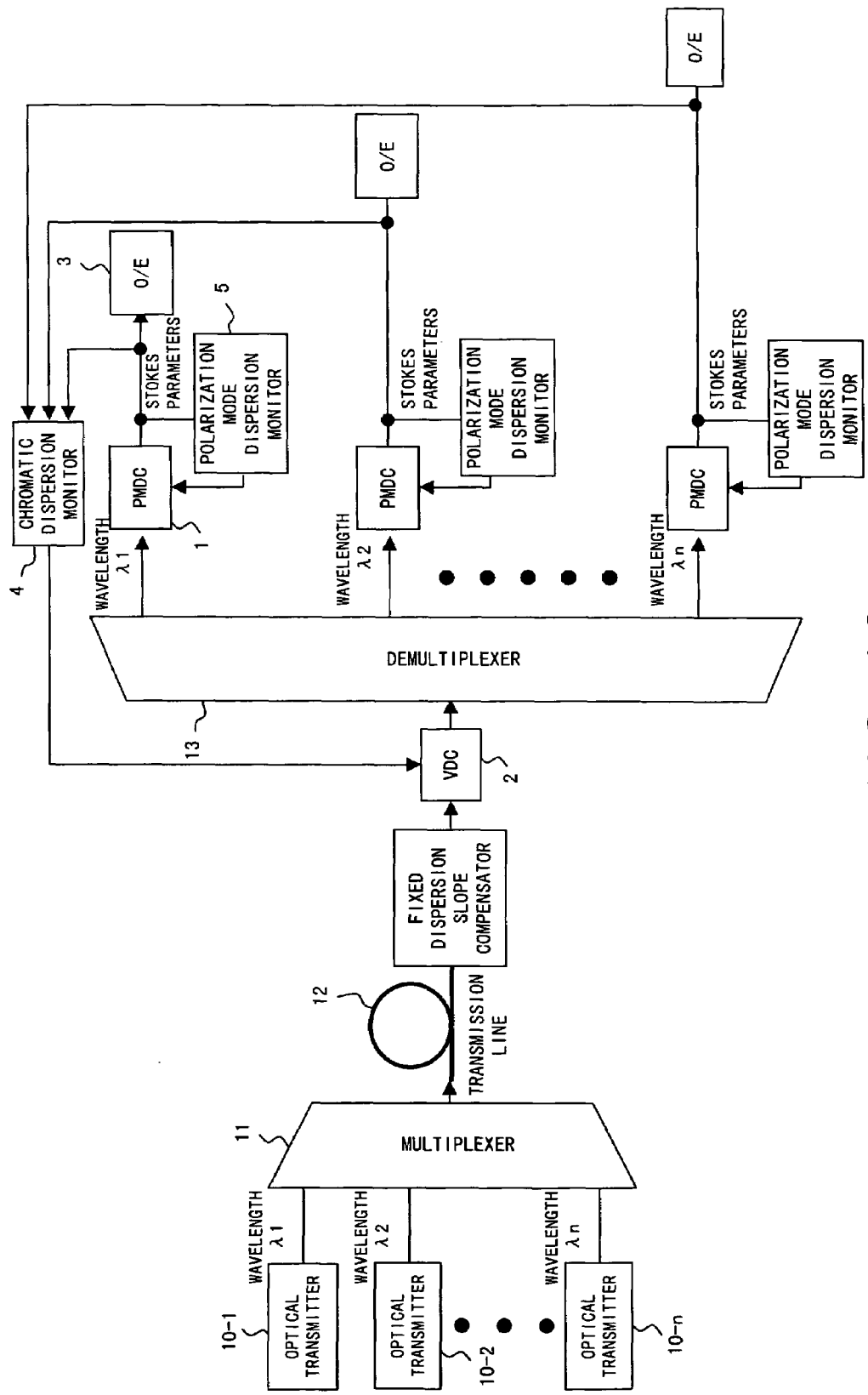
FIG. 13 shows another example of the seventh preferred embodiment of the present invention (No. 4)
Figure 14:
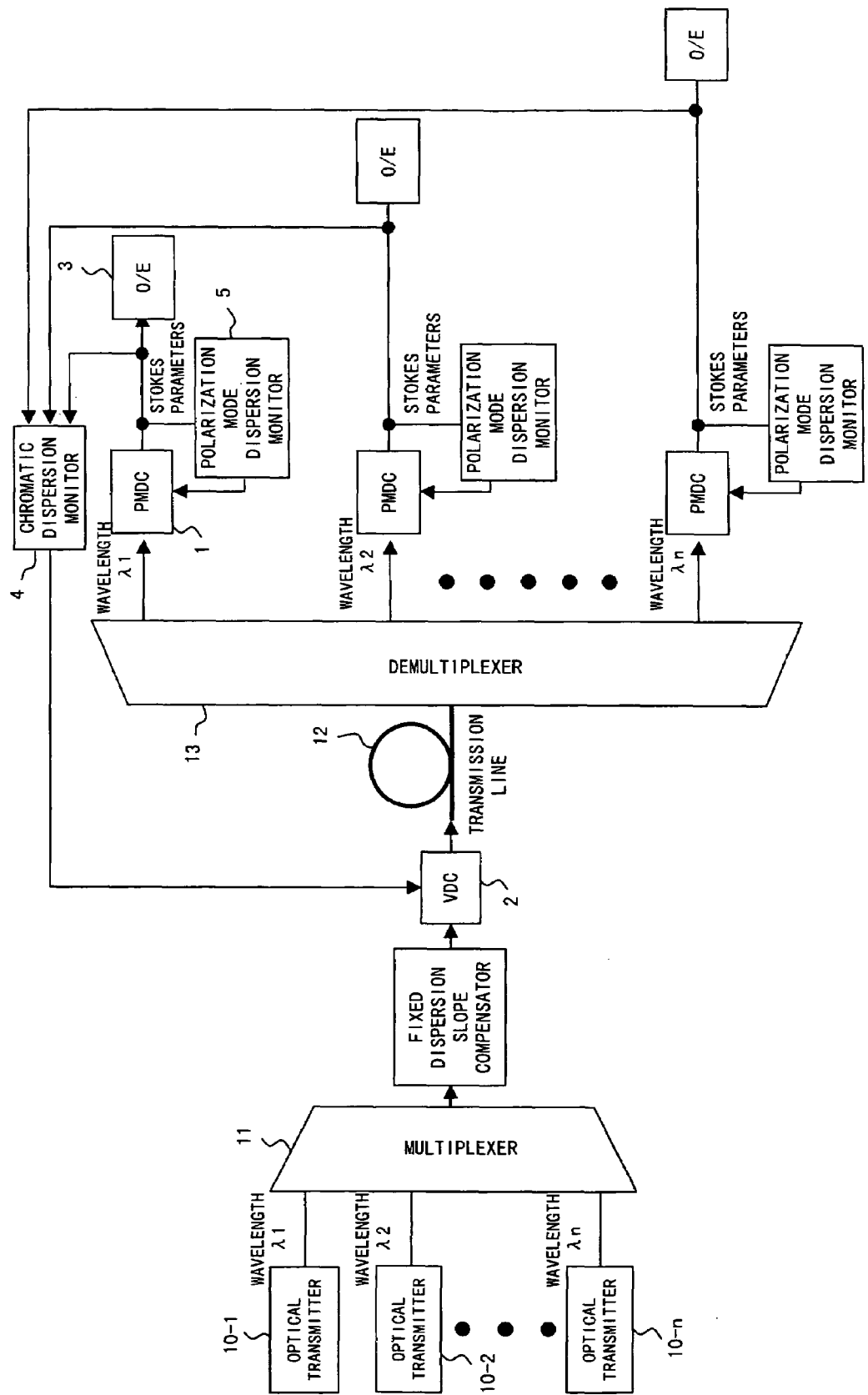
FIG. 14 shows another example of the seventh preferred embodiment of the present invention (No. 5)
Figure 15:
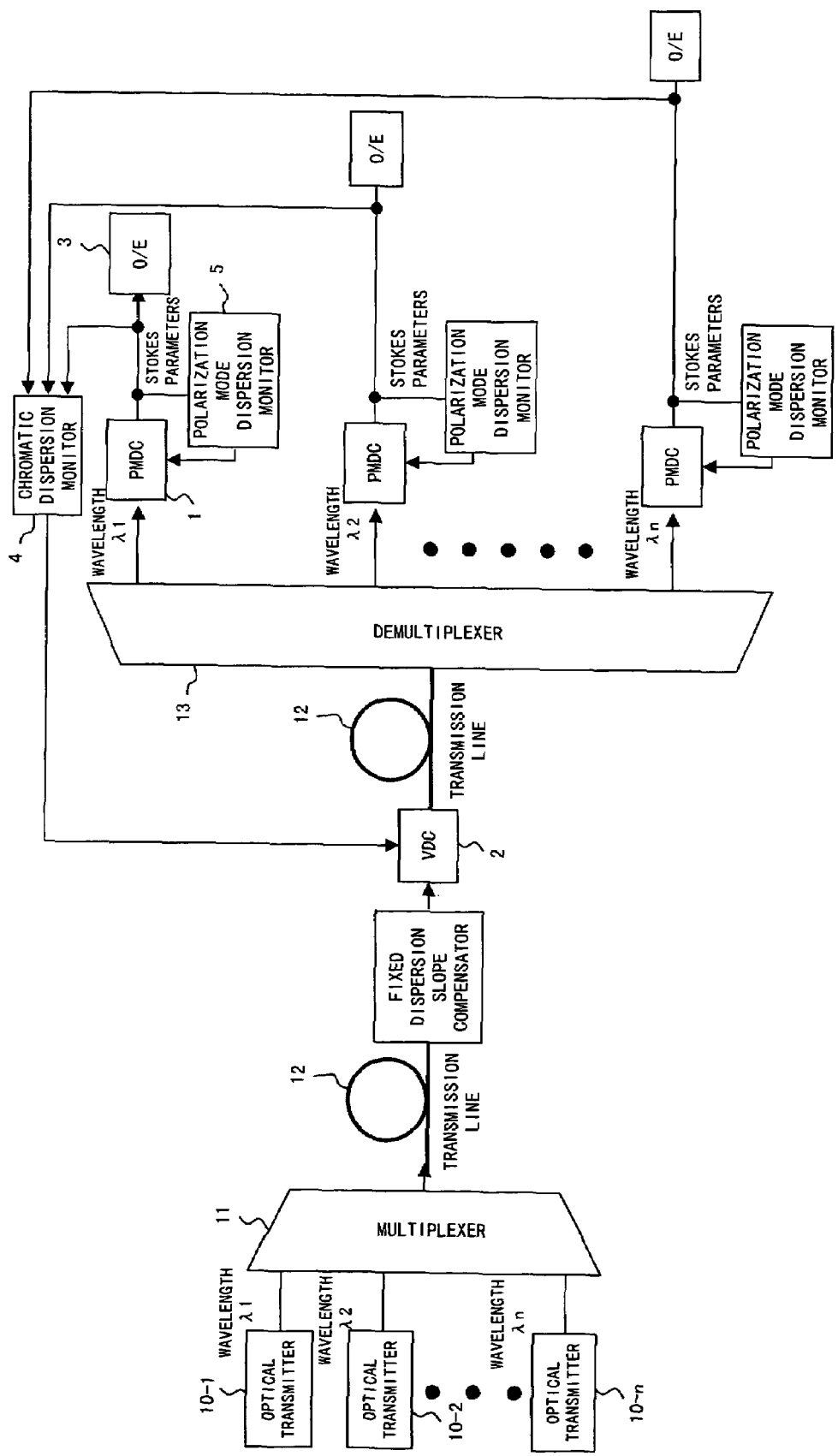
FIG. 15 shows another example of the seventh preferred embodiment of the present invention (No. 6)

In FIGS. 13 through 15, by disposing a fixed chromatic dispersion slope compensator, such as a fiber grating, a DCF or the like, together with a variable chromatic dispersion compensator (VDC), chromatic dispersion slope can also be compensated. However, the disposition order of the variable chromatic dispersion compensator and fixed chromatic dispersion slope is not limited.

Specifically, in FIG. 13, a fixed chromatic dispersion slope compensator and a variable chromatic dispersion compensator (VDC) are disposed on a receiver side or in a receiver. In FIG. 14, these are disposed on a transmitter side or in a transmitter. In FIG. 15, these are disposed in a repeater or in an independent position in the middle of a transmission line.

In this case, it is not also always necessary for a chromatic dispersion monitor to monitor the chromatic dispersion values of optical signals with all wavelengths demultiplexed on the receiver side, and it is sufficient if the chromatic dispersion values of one or more optical signals are measured. It is also important for the observation point of the chromatic dispersion monitor to be disposed after a polarization mode dispersion compensator (PMDC) (on the receiver side or closer to an O/E).

The fixed chromatic dispersion slope compensator flattens the chromatic dispersion slope of an optical fiber, being a transmission line. In this case, the characteristic of an optical fiber to be used must be checked in advance, and the compensation value of the fixed chromatic dispersion slope compensator must be determined.

Since the fixed chromatic dispersion slope compensator is publicly known, its description is omitted.

In order to feedback-control the variable chromatic dispersion compensator, transmission signals in one or more channels are used as monitors after being demultiplexed at the receiving terminal. However, since it is presumed that polarization mode dispersion is compensated, the control shown in the flowchart of FIG. 16 becomes necessary.

Figure 16:
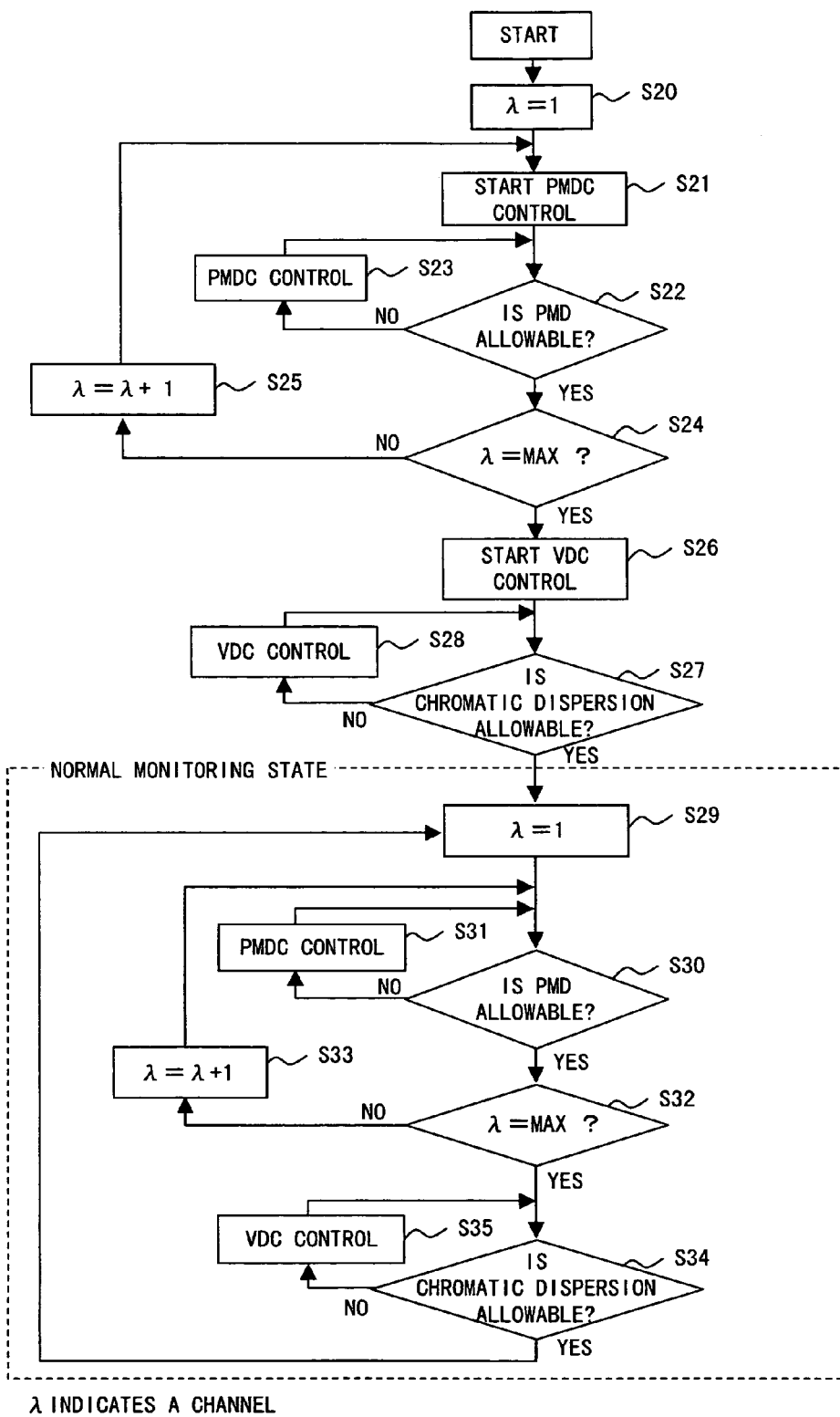
FIG. 16 is a flowchart showing the dispersion compensation control process of the preferred embodiments shown in FIGS. 10 through 15.

FIG. 16 is a flowchart showing the dispersion compensation control process of the preferred embodiments shown in FIGS. 10 through 15.

Firstly, it is assumed that at the beginning stage of the control, a VDC does not operate and the VDC simply let optical signals pass through it. Then, in step S20, λ, which is the identification number of the channel of a wavelength-division multiplex signal, is set to "1". Then, in step S21, PMDC control is started, and in step S22 it is determined whether PMD is within its allowable range. If PMD is out of the allowable range, in step S23 PMD control is performed, and the process returns to step S22. In step S22, the control is repeated until PMD becomes within the allowable range. Then, when PMD becomes within the allowable range, the process proceeds to step S24, and in step S24 it is determined whether the control is completed for all channels. If in step S24 it is determined that the control is not completed yet for all channels, in step S25 λ is incremented, and the process returns to step S21. In step S21, the process is repeated. If in step S24 it is determined that the PMD control is completed for all channels, in step S26 the VDC control is started.

In step S27, as a result of chromatic dispersion it is determined whether chromatic dispersion is within its allowable range. In this case, it can be all the channels of an optical signal, a part of the channels or only one channel that are monitored. If chromatic dispersion is out of the allowable range, in step S28 VDC control is performed and the process returns to step S27. In step S27, the control is continued until chromatic dispersion becomes within the allowable range. If in step S27 it is determined that chromatic dispersion is within the allowable range, the process proceeds to step S29 and enters a normal monitoring state.

In the normal monitoring state, in step S29, λ specifying a channel is set to "1", and in step S30 it is determined whether PMD is within the allowable range. If PMD is out of the allowable range, in step S31 PMDC is controlled and the process returns to step S30. In step S30, the control is continued until PMD becomes within the allowable range. If in step S30 it is determined that PMD is within the allowable range, the process proceeds to step S32. In step S32, it is determined whether PMD compensation is completed for all channels. If it is determined that PMD compensation is not completed for all channels, in step S33 λ specifying a channel is incremented, and the process returns to step S30. In step S30, PMD compensation is performed for another channel. If in step S32 it is determined that PMD compensation is completed for all channels, the process proceeds to step S34, and it is determined whether chromatic dispersion is within its allowable range. In this case, as described above, it can be for all the channels, a part of the channels or only one channel that chromatic dispersion is measured. If it is determined that chromatic dispersion is out of the allowable range, in step S35 VDC is control and the process returns to step S34.

Until, in step S34, it is determined that chromatic dispersion becomes settled within the allowable range, the process proceeds to step S35, and the VDC control is repeated. If in step S34 it is determined that chromatic dispersion becomes settled within the allowable range, it is regarded that chromatic dispersion compensation is completed, and the process returns to step S29. In the normal monitoring state, the processes in steps S29 through S34 are repeated, and monitor is always conducted to maintain the respective states of polarization mode dispersion and chromatic dispersion optimal.

Figure 17:
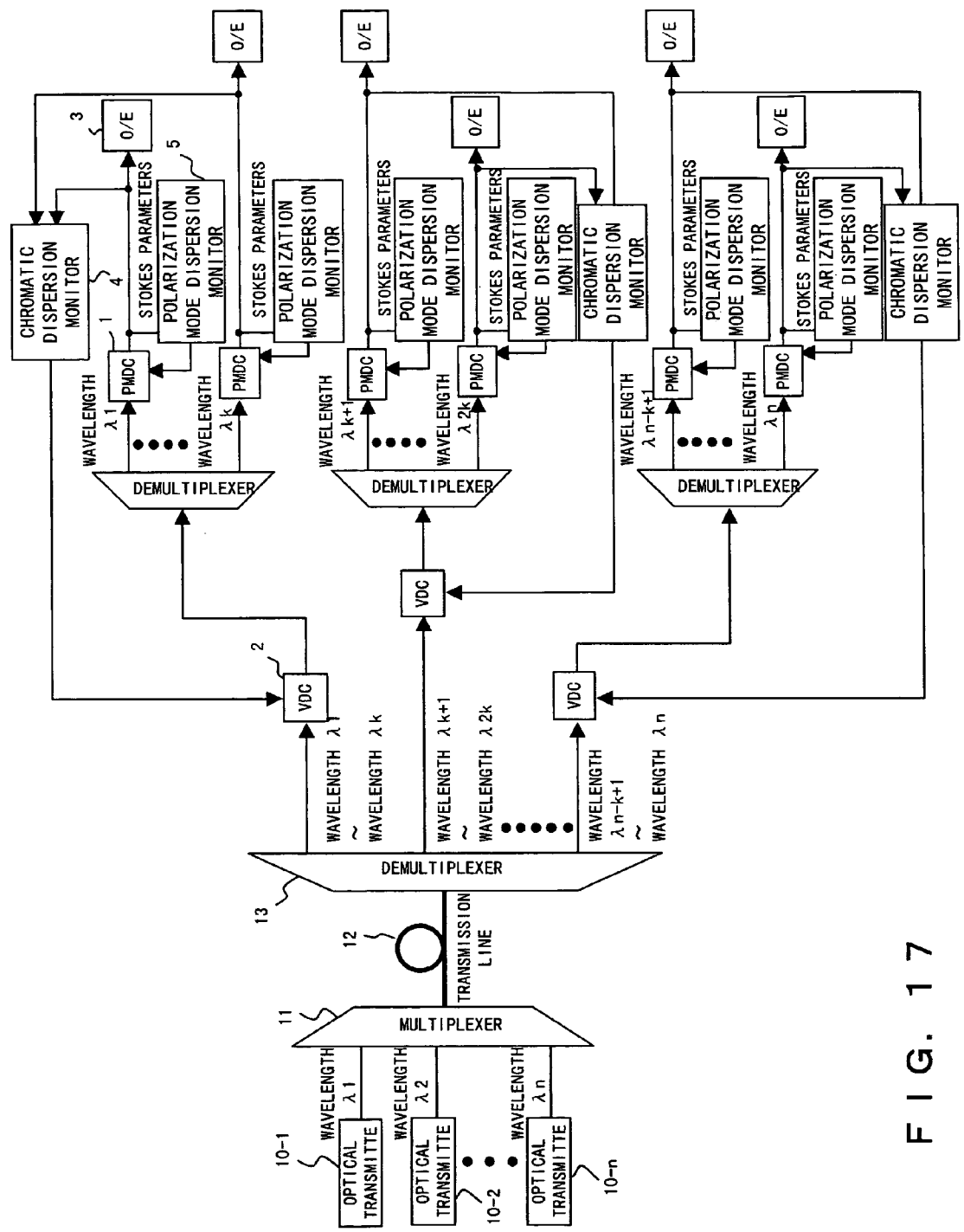
FIG. 17 shows the configuration of the eighth preferred embodiment of the present invention (No. 1)
Figure 18:
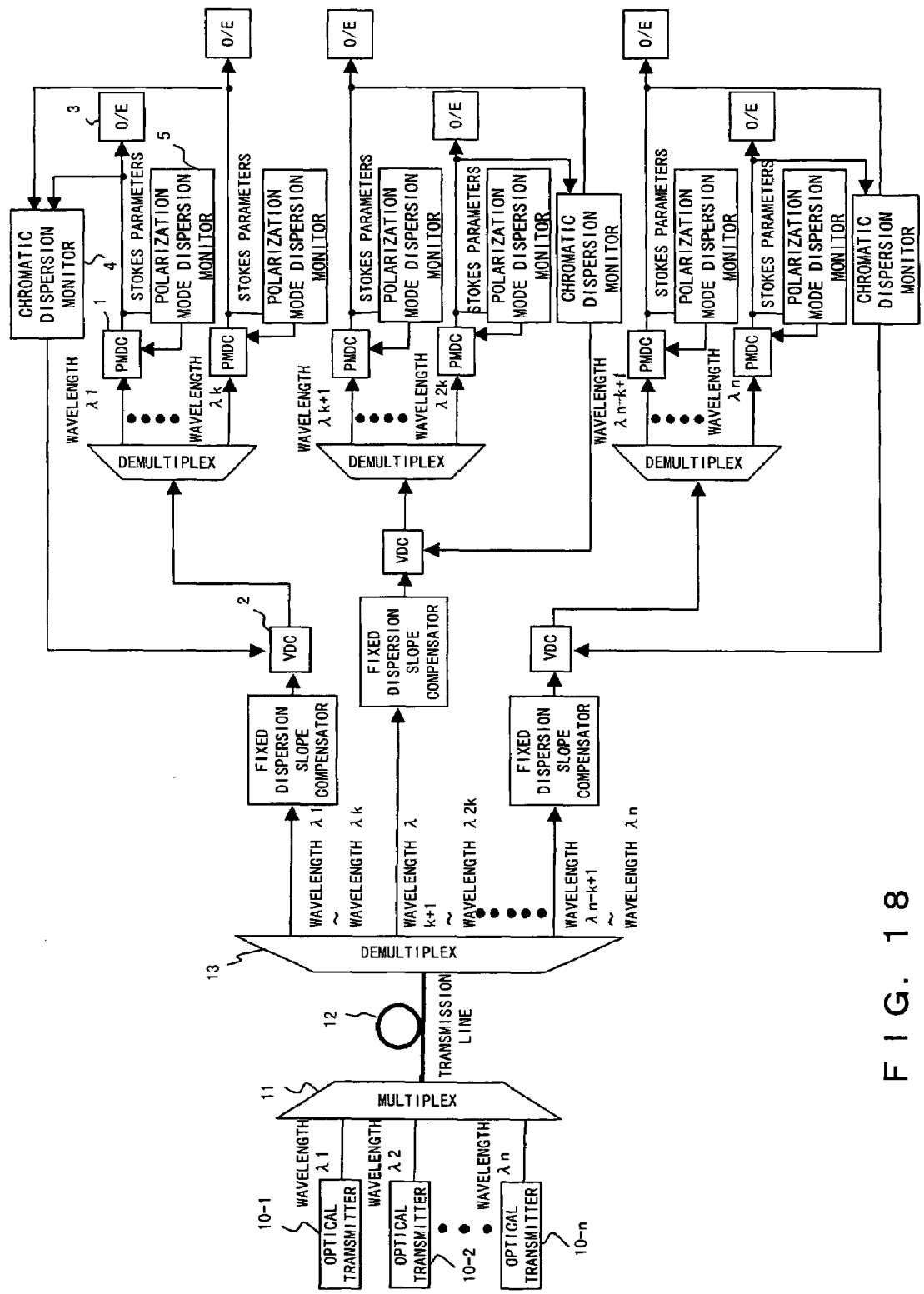
FIG. 18 shows the configuration of the eighth preferred embodiment of the present invention (No. 2)

FIGS. 17 and 18 show the configurations of the eighth preferred embodiment of the present invention.

In FIGS. 17 and 18, the same reference numerals as those of FIG. 15 are attached to the same components, and their descriptions are omitted. In the configuration shown in FIG. 17, after a wavelength-division multiplex signal is demultiplexed by a demultiplexer inserted in a receiving terminal or the like, the demultiplexed signals are collectively inserted for each plurality of channels in a variable chromatic dispersion compensator. Then, a polarization mode dispersion compensator is disposed for each individual wavelength of a signal that is demultiplexed into a single channel by a demultiplexer inserted after the variable chromatic dispersion compensator. By feedback-controlling the variable chromatic dispersion compensator, using the plurality of channels of transmission signals whose polarization mode dispersion is compensated by the polarization mode dispersion compensator, an automatic dispersion compensation system can be realized.

In this case too, λ1 through λn specifying channels are symbols used simply to discriminate channels, and have no special relationship to wavelength values. Therefore, how to collect signals for each plurality of channels after demultiplexing a wavelength-division multiplex light by a demultiplexer is not particularly limited in the preferred embodiment.

In one configuration of the preferred embodiment shown in FIG. 17, one of a plurality of groups of channels is inputted to each VDC and its chromatic dispersion is compensated. This method is effective when the operation band of the VDC is limited and the DVC has no bandwidth sufficient to cover the entire optical wavelength-division multiplex signal. For example, when using a device using a fiber grating as a VDC, usually the fiber grating cannot collectively compensate for chromatic dispersion across the entire band of the wavelength-division multiplex light since its operation band is narrow. In this case, a plurality of VDCs each using a fiber grating with a different center frequency of an operation band is prepared, optical signals of channels corresponding to these operation bands are grouped and inputted to the plurality of VDCs, and their chromatic dispersion is compensated by the plurality of VDCs.

In the configuration shown in FIG. 18, a fixed chromatic dispersion slope compensator, such as a fiber grating, a DCF or the like, is disposed together with the variable chromatic dispersion compensator, and chromatic dispersion slope is also compensated together with chromatic dispersion. However, the disposition order of the variable chromatic dispersion compensator and fixed chromatic dispersion slope compensator is not limited.

The configuration of this preferred embodiment shown in FIG. 18 can be obtained by combining the seventh preferred embodiment and the configuration shown in FIG. 17, and can compensate for not only a chromatic dispersion value but also its chromatic dispersion slope. In this case, since a fixed chromatic dispersion slope compensator is used, chromatic dispersion slope to be compensated must be set based on the pre-check result of the characteristic of an optical fiber, being a transmission line.

In the eighth preferred embodiment, since it is presumed that variable chromatic dispersion is in advance compensated, the control shown in the flowchart of FIG. 19 is necessary over each variable chromatic dispersion compensator.

FIG. 19 is a flowchart showing the control process of the eighth preferred embodiment.

Firstly, in a state where neither a PMDC nor a VDC operates, in step S40, λ specifying a channel is set to "1". Then, in step S41, PMDEC control is started. Then, in step S42, it is determined whether PMD is within its allowable range. If it is determined that PMD is out of the allowable range, in step S43 PMD control is performed, and the process returns to step S42. In step S42, the control is repeated until PMD becomes within the allowable range. If in step S42 it is determined that PMD is within the allowable range, the process proceeds to step S44, and it is determined whether PMD compensation is completed for all channels. If PMD compensation is not completed for all channels yet, in step S45 λ specifying a channel is incremented, and the process returns to step S41. In step S41, PMDC control is performed for another channel. If in step S44 it is determined that the control is completed for all channels, in step S46 VDC control is started.

Firstly, in step S47 it is determined whether chromatic dispersion is within its allowable range. If chromatic dispersion is out of the allowable range, in step S48 VDC control is performed, and the process returns to step S47. In step S47, VDC control is performed until chromatic dispersion becomes within the allowable range. If in step S47 it is determined that chromatic dispersion is within the allowable range, the process proceeds to step S49, and enters its normal monitoring state.

In step S49, λ specifying a channel is set to "1", and in step S50 it is determined whether PMD is within the allowable range. If in step S50 it is determined that PMD is out of the allowable range, in step S51 PMD control is performed, and the process returns to step S50. In step S50, the process is repeated until PMD becomes within the allowable range. If in step S50 PMD is out of the allowable range, the process proceeds to step S52, and it is determined whether PMD compensation is optimally performed for all channels. If there is an unprocessed channel, in step S53 λ is incremented, and the process returns to step S50.

If in step S52 it is determined that PMD compensation is appropriately made for all channels, the process proceeds to step S54, and it is determined that chromatic dispersion is within its allowable range. If it is determined that chromatic dispersion is out of the allowable range, in step S55 VDC control is performed, and the process returns to step S54. If in step S54 it is determined that chromatic dispersion is within the allowable range, the process returns to step S49. In step S49, the process is repeated and monitoring control is continued.

In the eighth preferred embodiment too, as in the above-mentioned preferred embodiments, there is no need for a chromatic dispersion monitor to measure chromatic dispersion values for all channels. Alternatively, the value can be measured for at least one or more channels and the chromatic dispersion of other channels can be compensated based on the amount of chromatic dispersion estimated from both the characteristic of a transmission line and the measured value.

Figure 20:
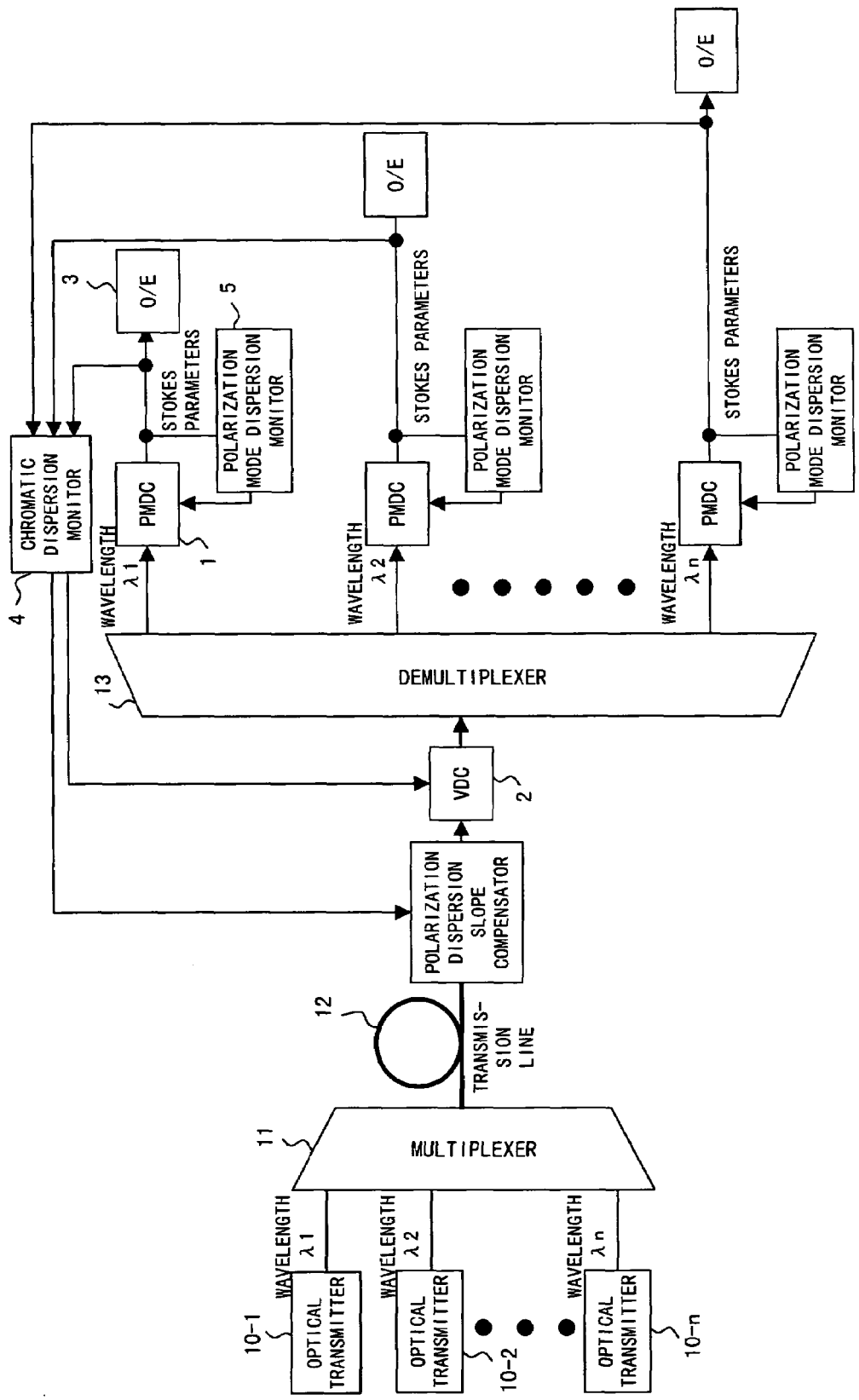
FIG. 20 shows the configuration of the ninth preferred embodiment of the present invention (No. 1)
Figure 21:
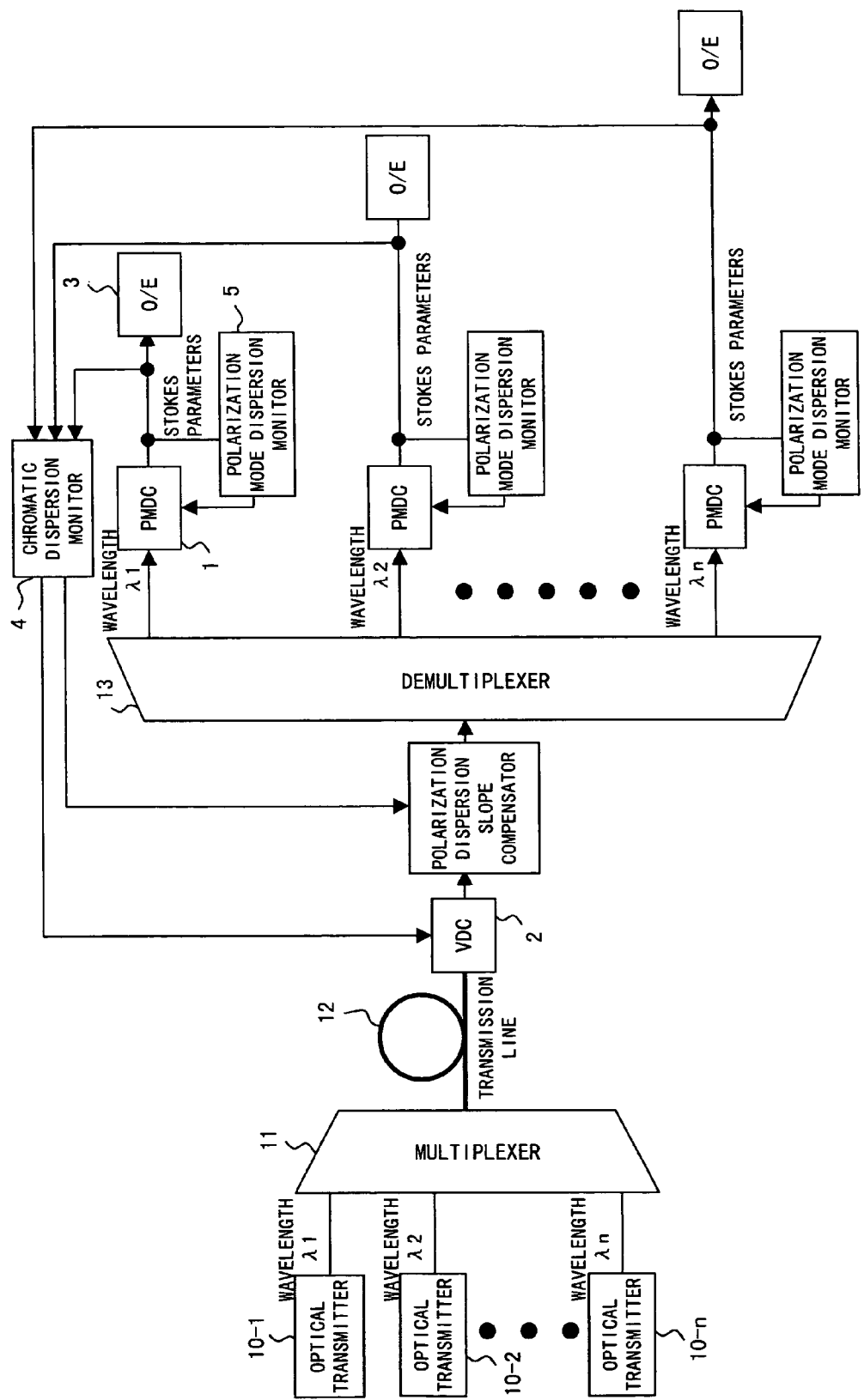
FIG. 21 shows the configuration of the ninth preferred embodiment of the present invention (No. 2)

FIGS. 20 and 21 show the configurations of the ninth preferred embodiment of the present invention.

In FIGS. 20 and 21, the same reference numerals as those of FIG. 17 are attached to the same components, and their descriptions are omitted. In this preferred embodiment, an automatic dispersion compensation system for also performing automatic chromatic dispersion slope compensation can be realized by adding a new variable chromatic dispersion slope compensator to the configuration for collectively performing chromatic dispersion compensation for all wavelengths.

When feedback-controlling only a variable chromatic dispersion compensator, it is theoretically possible to control the variable chromatic dispersion compensator by monitoring only one channel of transmission signals whose polarization mode dispersion is individually compensated. However, when controlling a variable chromatic dispersion slope compensator, the monitor of a plurality of channels is necessary. This is because the influence of chromatic dispersion slope appears in the difference in the way of receiving chromatic dispersion among a plurality of channels.

For example, when monitoring chromatic dispersion for two channels, the basic way of thinking as follows.

When it is assumed that wavelengths to be monitored are $\lambda 1$ and $\lambda 2$, a difference in wavelength between them $d=\lambda 2-\lambda 1$.

It is assumed that the chromatic dispersion value of $\lambda 1$ and that of $\lambda 2$ are cd1 and cd2, respectively.

Then, chromatic dispersion slope is as follows, $$(cd2-cd1)/2$$

and chromatic dispersion slope can also be feedback-controlled.

In the configurations shown in FIGS. 20 and 21, a variable chromatic dispersion slope compensator is provided instead of the fixed chromatic dispersion slope compensator shown in FIGS. 13 through 15. A control signal based on chromatic dispersion slope monitored by a chromatic dispersion monitor is inputted to this variable chromatic dispersion slope compensator. The variable chromatic dispersion slope compensator can be disposed before or after a VDC. Specifically, a variable chromatic dispersion slope compensator and a VDC can be disposed as shown in FIG. 20 or 21.

The number of wavelengths (channels) to be monitored (observed) by a chromatic dispersion monitor is plural. As described earlier, this is because in order to dynamically compensate for chromatic dispersion slope it is necessary to always measure the amount of chromatic dispersion between channels.

Figure 22:
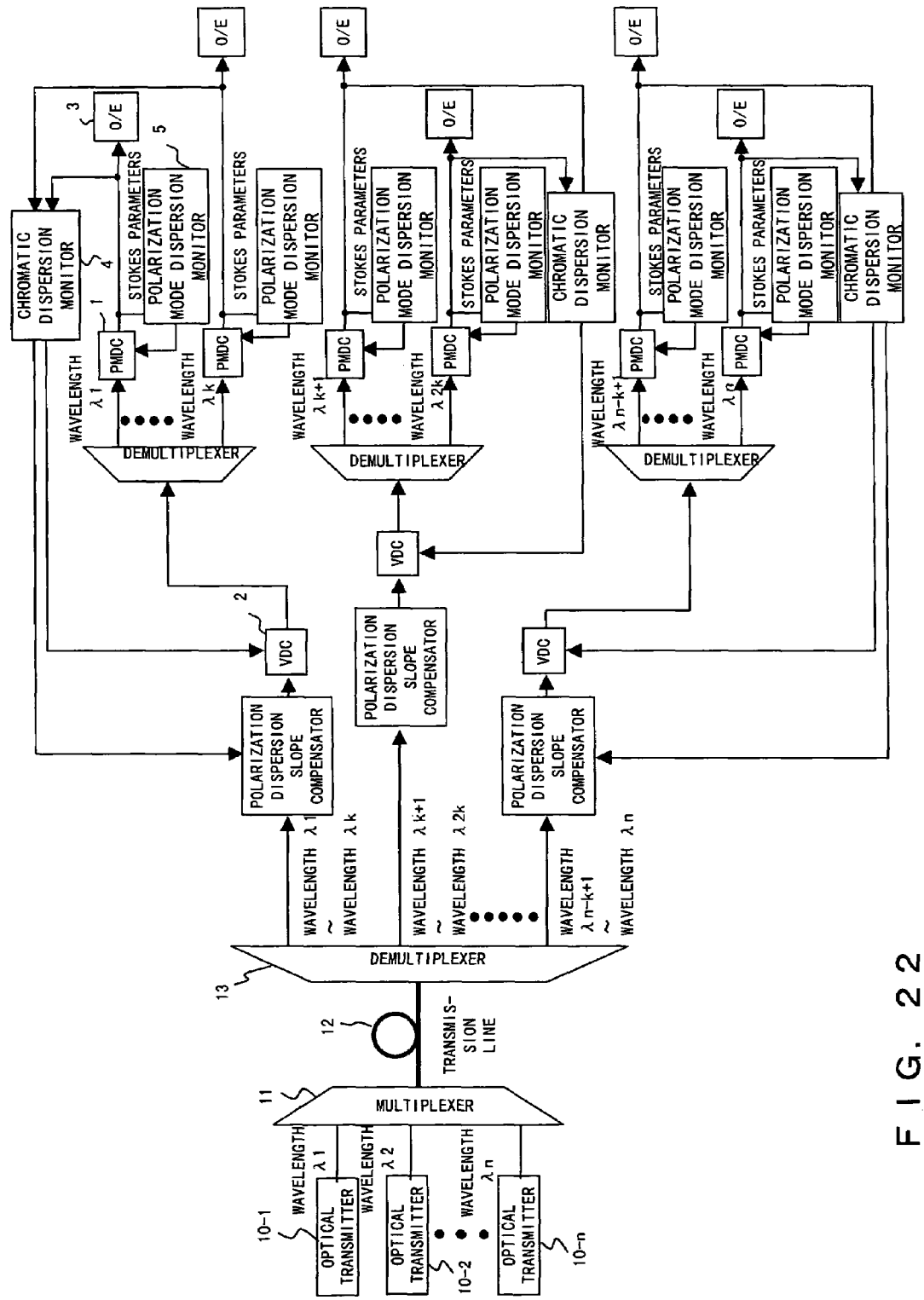
FIG. 22 shows the configuration of the tenth preferred embodiment of the present invention (No. 1)
Figure 23:
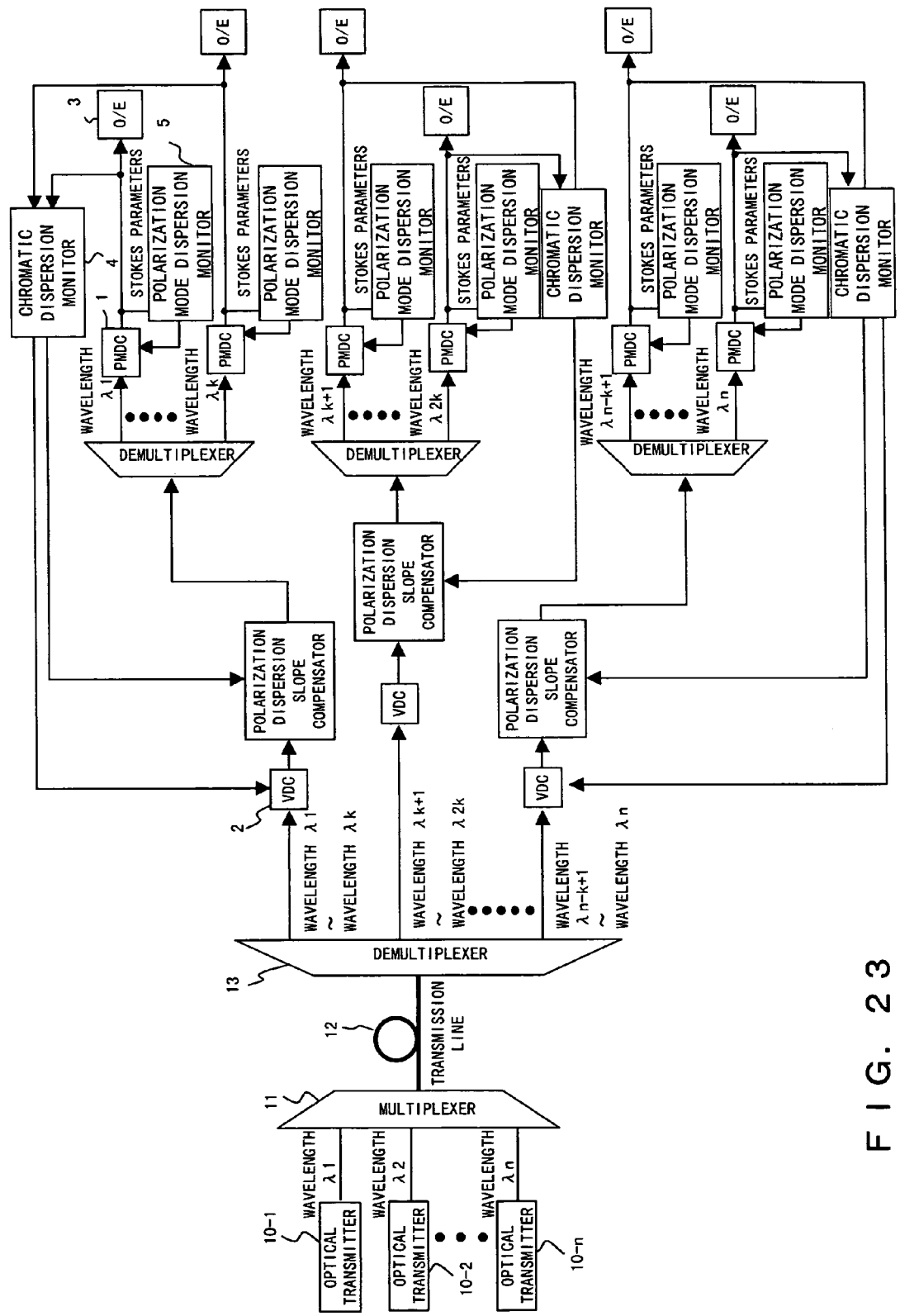
FIG. 23 shows the configuration of the tenth preferred embodiment of the present invention (No. 2)

FIGS. 22 and 23 show the configurations of the tenth preferred embodiment of the present invention.

In FIGS. 22 and 23, the same reference numerals as those of FIG. 17 are attached to the same components, and their descriptions are omitted. In this preferred embodiment, after demultiplexing a wavelength-division multiplex signal by a demultiplexer inserted in the receiving terminal or the like, both a variable chromatic dispersion compensator and a variable chromatic dispersion slope compensator are collectively inserted for each plurality of channels, and a polarization mode dispersion compensator is further disposed for each individual wavelength demultiplexed into a single channel by a demultiplexer that is inserted after the variable chromatic dispersion compensator. By feedback-controlling both the variable chromatic dispersion compensator and variable chromatic dispersion slope compensator using a plurality of channels of transmission signals whose polarization mode dispersion is compensated by the polarization mode dispersion compensators as chromatic dispersion monitors, an automatic dispersion compensation system also compensating for chromatic dispersion slope can be realized.

According to this preferred embodiment, an automatic dispersion compensation system for implementing both automatic chromatic dispersion compensation and polarization mode dispersion compensation can be realized. As a result, automatic dispersion compensation can be effectively made in an optical communication system, and accordingly, its super-high speed and long haul can be realized.

In FIGS. 22 and 23, on the receiving side, after demultiplexing a wavelength-division multiplex light by a demultiplxer, the demultiplexed signals are grouped, their chromatic dispersion and chromatic dispersion slope are compensated for each group. Then, each group is demultiplexed into each wavelength by a demultiplexer and its polarization mode dispersion is compensated. In this case, signals with each wavelength indicated by both $\lambda$ and a subscript are discriminated only by this $\lambda$, and do not restrict how to group wavelengths.

As described earlier, when the operation band width of a VDC is limited, such grouping is often made.

The number of channels to be monitored by a chromatic dispersion monitor is plural in each group.

Figure 24:
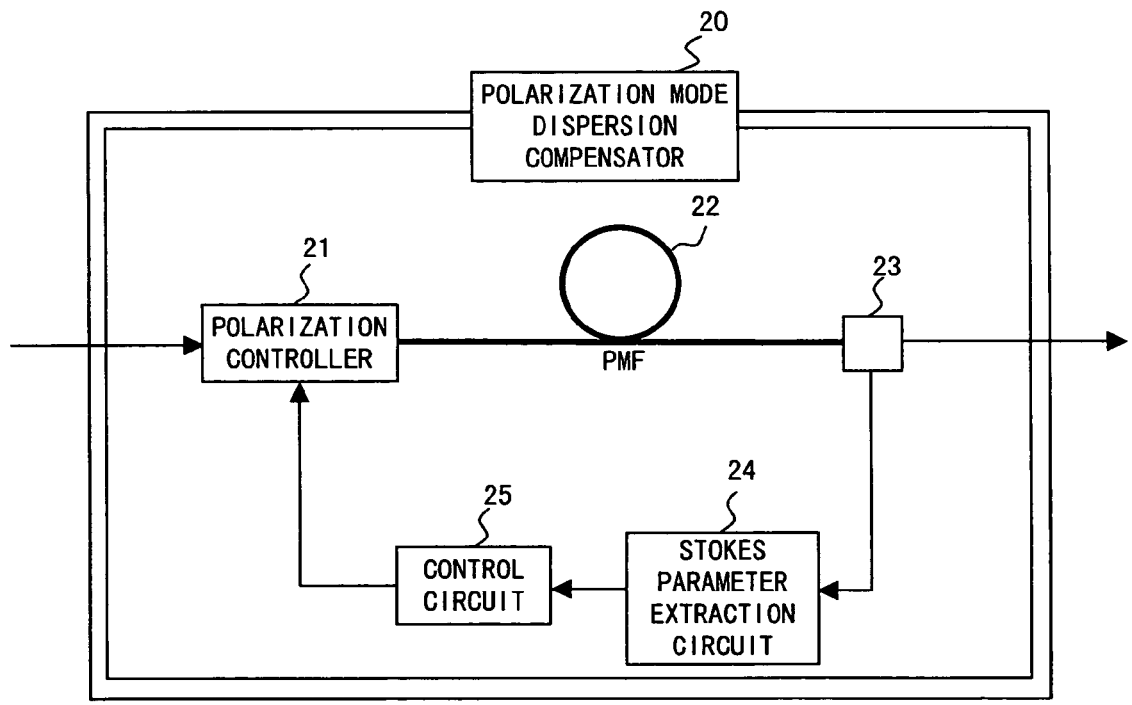
FIG. 24 shows one example of the configuration of the polarization mode dispersion compensator.

FIG. 24 shows one example of the configuration of the polarization mode dispersion compensator.

In FIG. 24, a polarization mode dispersion compensator 20 comprises a polarization controller 21, a polarization maintaining fiber 22, a coupler 23, a Stokes parameter extraction circuit 24 and a control circuit 25. Although the polarization mode compensator 20 generally comprises a polarization controller 21 composed of a wavelength plate, a Faraday rotor and the like, a polarization maintaining fiber (PMF) 22 and a controller 25, the polarization mode dispersion compensator 20 used in the preferred embodiment of the present invention further comprises the Stokes parameter extraction circuit 24 since the compensator 20 uses a Stokes parameter as a polarization mode dispersion detection parameter. The Stokes parameter can be calculated from the tilt of the electrical vector of light obtained by the polarization mode dispersion observation method described in "Description of the Related Art", according to the definition.

Although as shown in FIG. 24, a feedback circuit is formed in the polarization mode dispersion compensator 20, as described in the above-mentioned preferred embodiment, this circuit inputs a Stokes parameter from a polarization mode dispersion monitor, and performing optimal polarization mode dispersion compensation by controlling the polarization controller 21.

Figure 25:
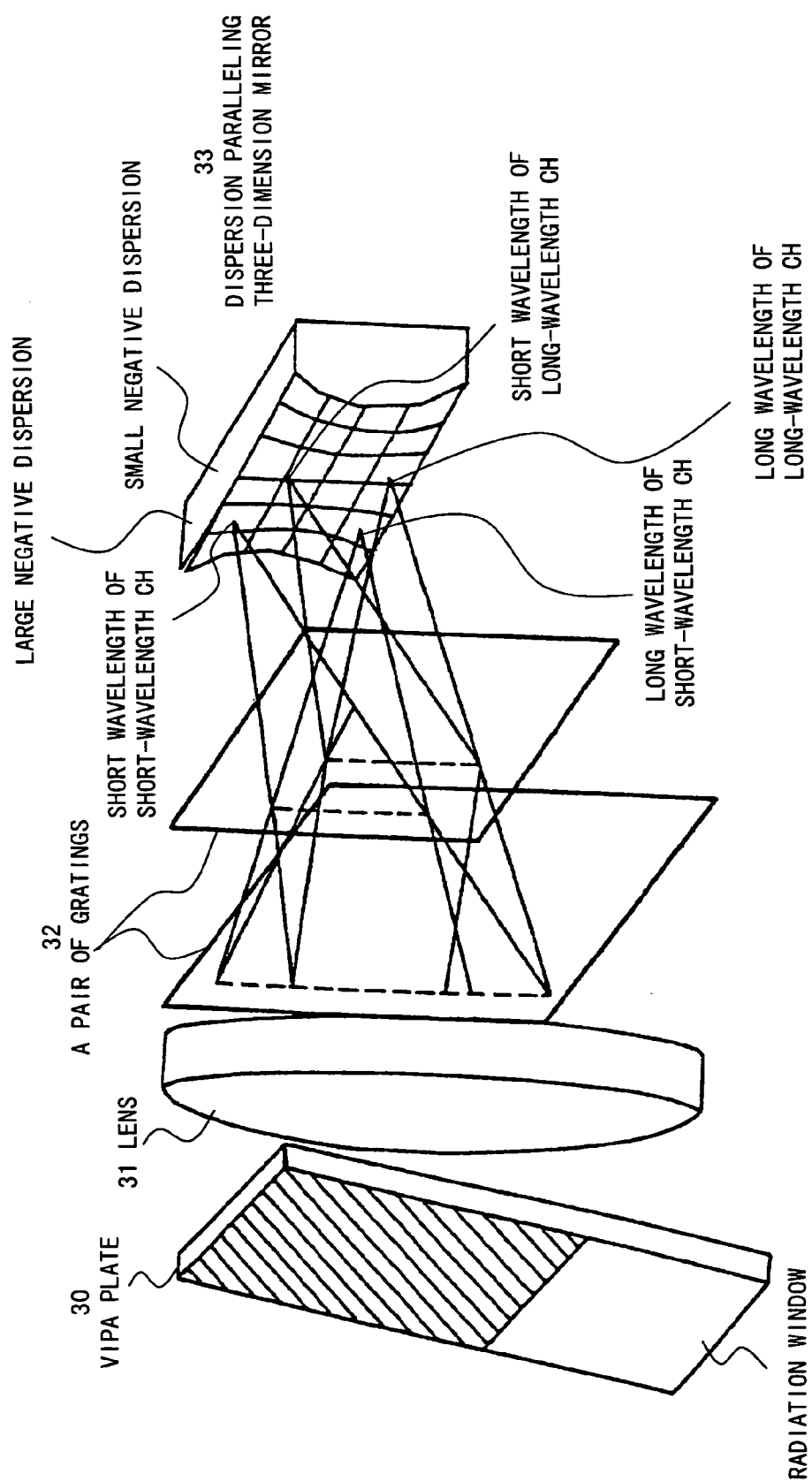
FIG. 25 shows the configuration of a chromatic dispersion compensator using a VIPA (virtually imaged phased array) plate as its one example.

FIG. 25 shows the configuration of a chromatic dispersion compensator using a VIPA (virtually imaged phased array) plate as its one example.

The VIPA plate receives light condensed in a line through the radiation window of the VIPA plate by a semi-cylindrical lens or the like after light outputted from an optical fiber is paralleled. Then, this light is multiply reflected in the VIPA plate, is outputted little by little from the VIPA plate and a plurality of segments of outputted light interferes with each other. By this interference, light that travels in a different direction depending on its wavelength is generated. After the output light obtained as a result of this interference is paralleled by a lens, the route of each segment of light with a different wavelength is changed by a means for changing the route depending on wavelength, such as a pair of gratings or the like. Then, each segment of light is applied to the surface of a dispersion flattening three-dimension mirror with a special surface shape. In this case, since each segment of light takes a different route for each wavelength, the reflection point of each segment of light on the three-dimension mirror varies depending on its wavelength. Each reflected segment of light goes back on the same route as that taken when coming, is inputted to the VIPA plate and is outputted from the radiation window.

Since the amount of dispersion given for each wavelength varies depending on its reflection point on the three-dimension mirror, a specific amount of chromatic dispersion can be given across the entire light. Since the reflection point on the three-dimension mirror of each different wavelength can be changed independently from the direction of light outputted by the VIPA plate, chromatic dispersion slope can be simultaneously controlled.

Therefore, chromatic dispersion from which the relevant optical signal suffers in a transmission line can be compensated by giving the same chromatic dispersion with a sign the reversal of that of the wavelength from which the relevant optical signal suffers in a transmission line, by this device. In particular, since chromatic dispersion different for each wavelength can be given, chromatic dispersion slope can be changed, and accordingly, chromatic dispersion slope can also be compensated.

Figure 26:
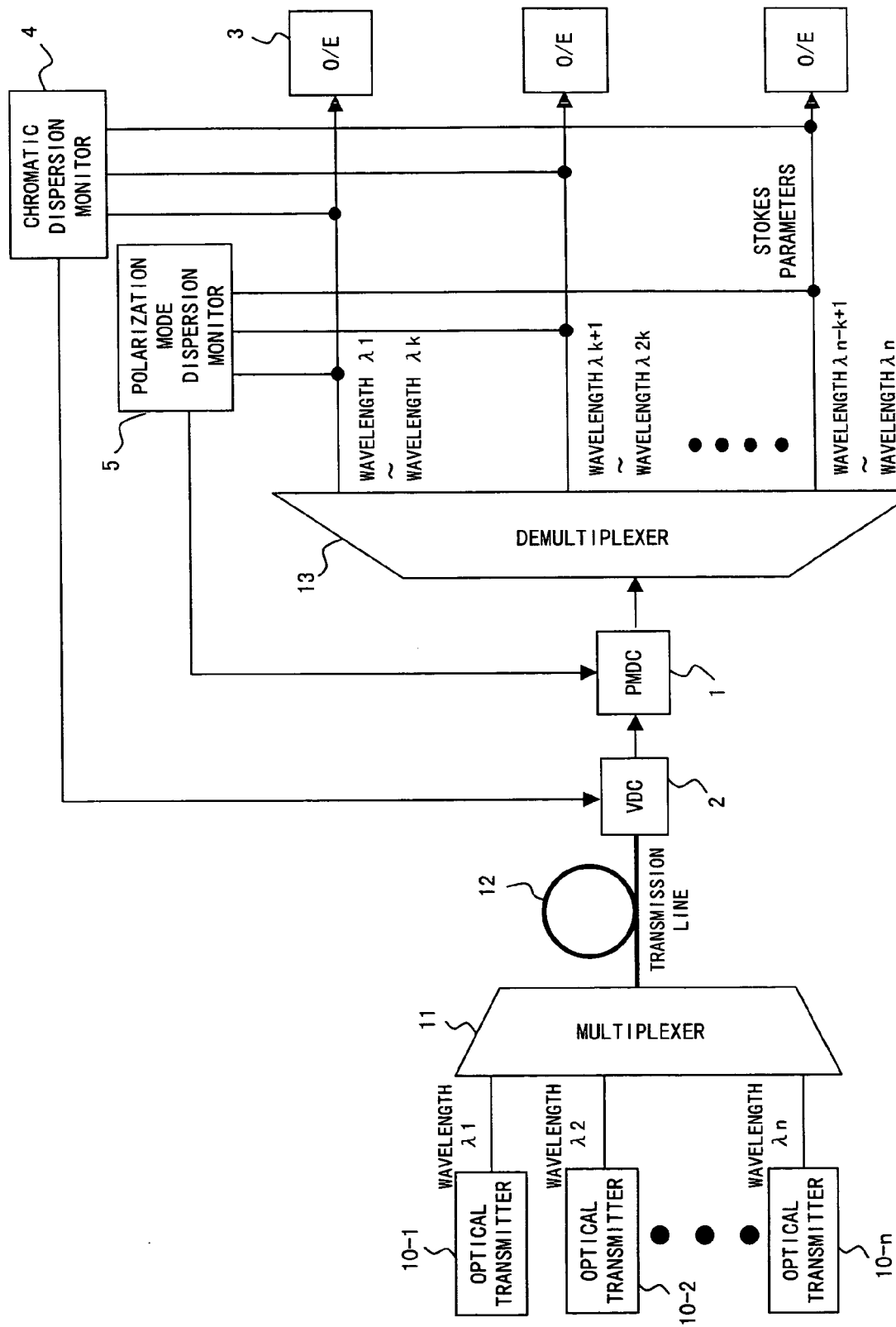
FIG. 26 shows the first configuration in which both chromatic dispersion and polarization mode dispersion are collectively compensated.

FIG. 26 shows the first configuration in which both chromatic dispersion and polarization mode dispersion are collectively compensated. In FIG. 26, the same reference numerals as those of FIG. 17 are attached to the same components, and their descriptions are omitted.

In this preferred embodiment, a polarization mode dispersion monitor and a chromatic dispersion monitor observe a polarization mode dispersion state and a chromatic dispersion state using one or more channels after demultiplexing, feed back the respective information to a VDC and a PMDC, respectively, and collectively compensates for dispersion across the entire wavelength-division multiplex light. The important point here is that the observation point of the chromatic dispersion monitor is disposed after the polarization mode dispersion compensator (PMDC). Thus, as in the above-mentioned preferred embodiments, both polarization mode dispersion and chromatic dispersion can be optimally compensated.

Figure 27:
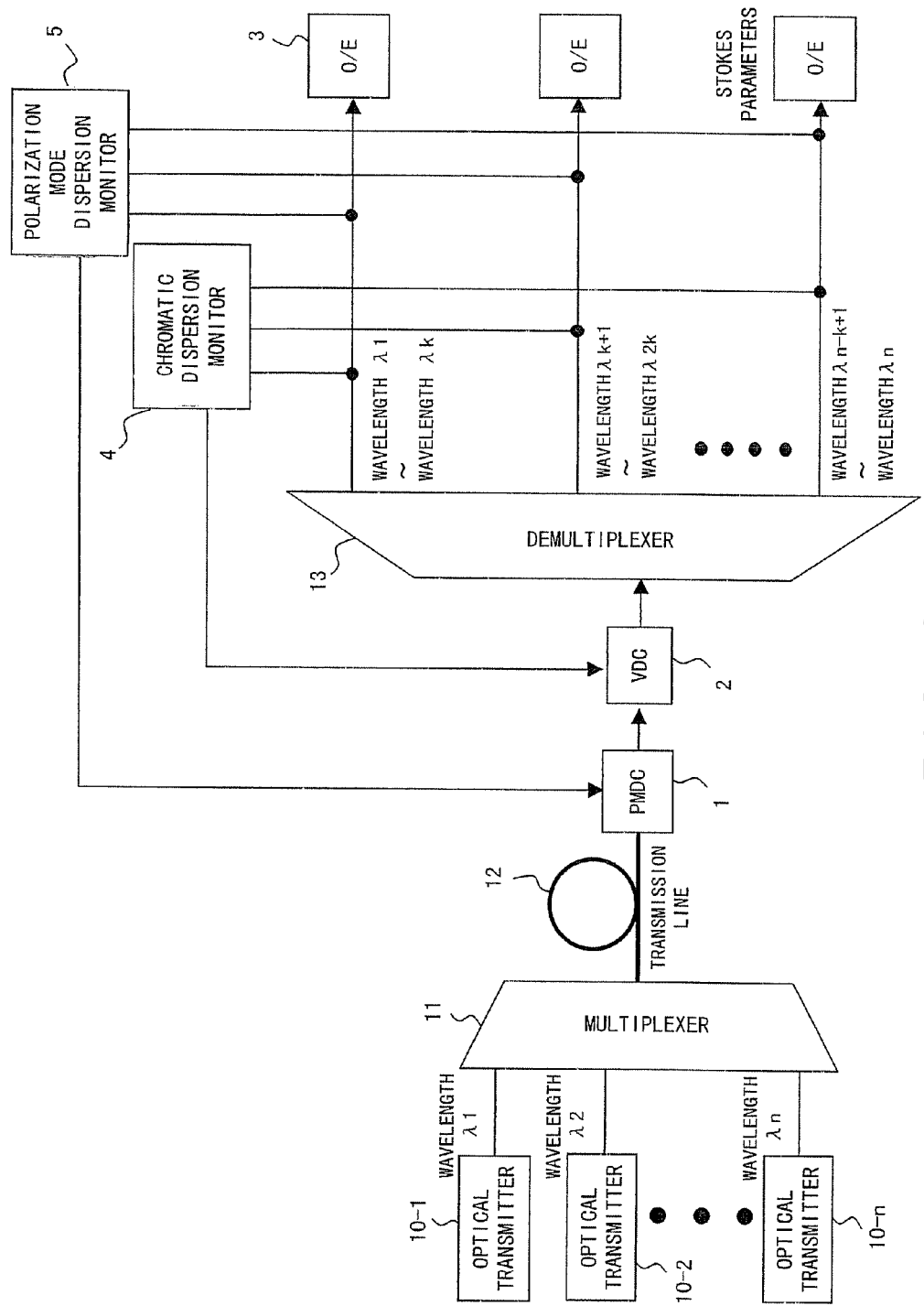
FIG. 27 shows the second configuration in which both chromatic dispersion and polarization mode dispersion are collectively compensated.

FIG. 27 shows the second configuration in which both chromatic dispersion and polarization mode dispersion are collectively compensated. In FIG. 27, the same reference numerals as those of FIG. 17 are attached to the same components, and their descriptions are omitted.

As described in the above-mentioned preferred embodiments, the disposition order of a VDC and a PMDC can be arbitrary in the configuration shown in FIG. 26. However, in FIG. 27, the disposition order of the VDC and PMDC in FIG. 26 is reversed. Since the operation of the remaining configuration is the same as that of the above-mentioned preferred embodiment, its description is omitted.

Although in this configuration, the observation point of a chromatic dispersion monitor is disposed before the observation point of a polarization mode dispersion monitor, this is no problem, and as described above, in this case, it is important to dispose the observation point of a chromatic dispersion monitor after a polarization mode dispersion compensator (PMDC).

Figure 28:
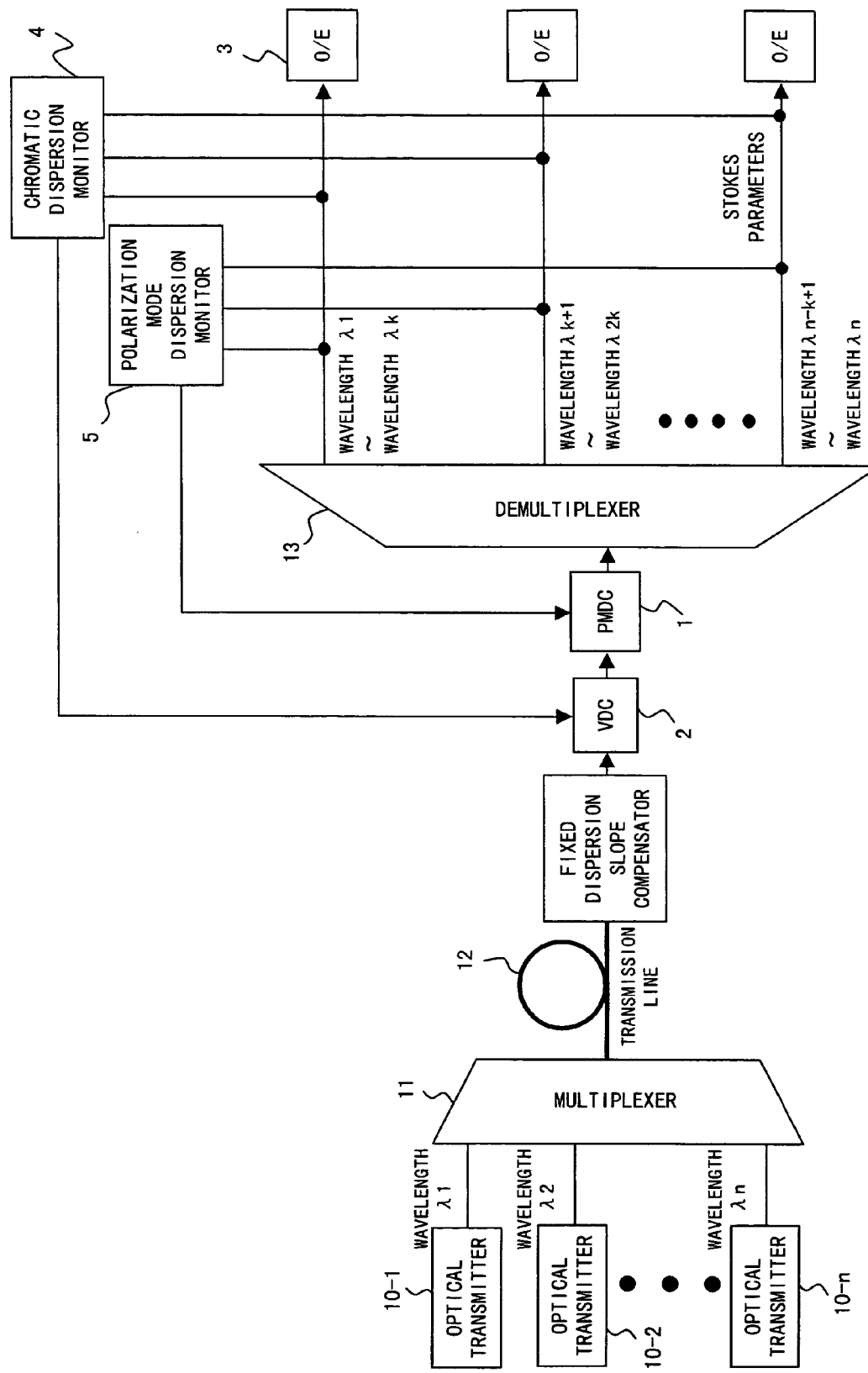
FIG. 28 shows the third configuration in which both chromatic dispersion and polarization mode dispersion are collectively compensated.

FIG. 28 shows the third configuration in which both chromatic dispersion and polarization mode dispersion are collectively compensated. In FIG. 28, the same reference numerals as those of FIG. 17 are attached to the same components, and their descriptions are omitted.

In this configuration, a fixed chromatic dispersion slope compensator is further disposed, and the disposition order of each compensator is arbitrary. However, the observation point of a chromatic dispersion monitor must be disposed after a polarization mode dispersion compensator (PMDC). There is no need for the chromatic dispersion monitor to always measure the chromatic dispersion of all demultiplexed wavelengths (channels), and the chromatic dispersion measurement of at least one or more channels is sufficient.

Figure 29:
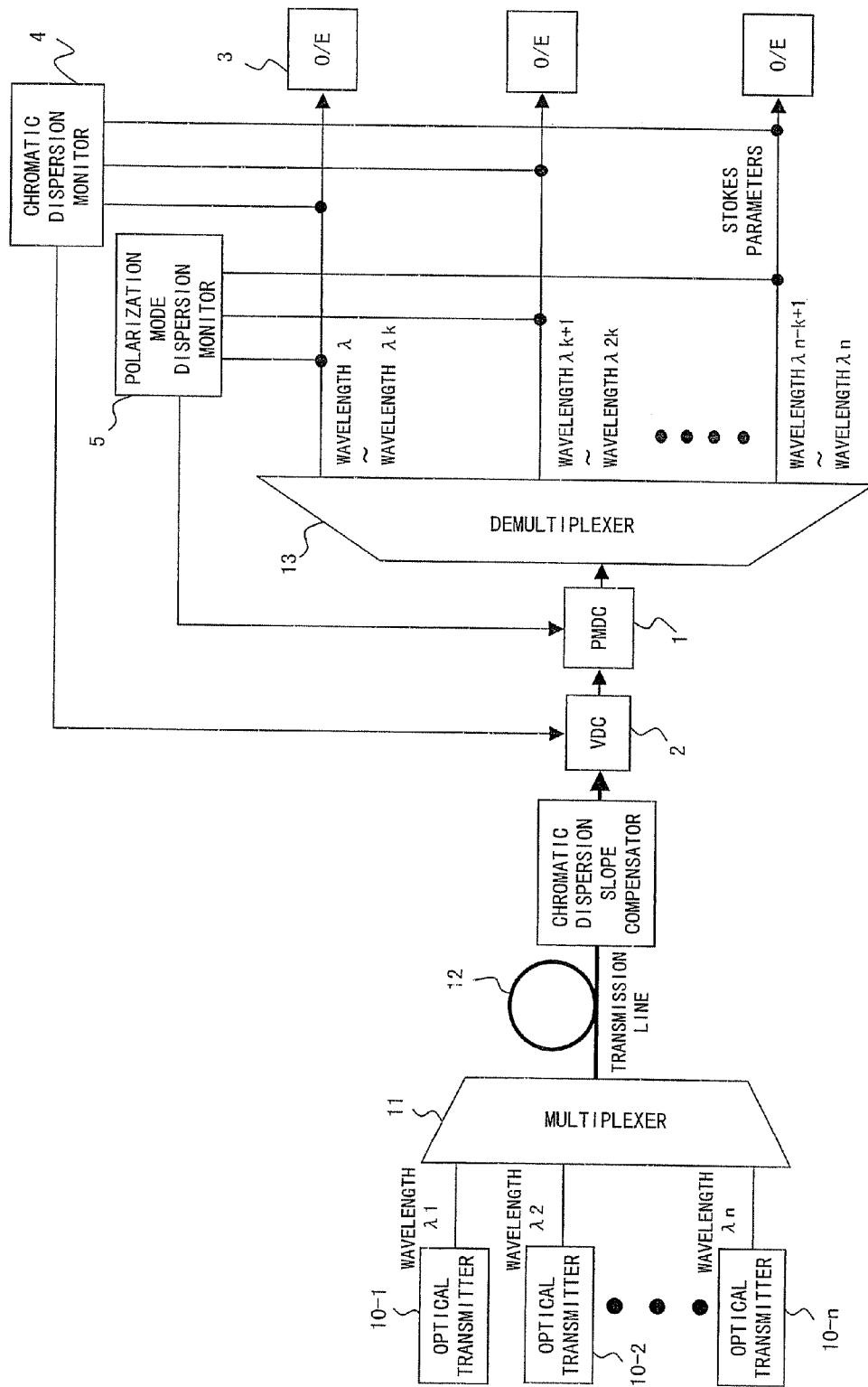
FIG. 29 shows the fourth configuration in which both chromatic dispersion and polarization mode dispersion are collectively compensated.

FIG. 29 shows the fourth configuration in which both chromatic dispersion and polarization mode dispersion are collectively compensated. In FIG. 29, the same reference numerals as those of FIG. 17 are attached to the same components, and their descriptions are omitted.

In this configuration, a variable chromatic dispersion slope compensator is further disposed, and chromatic dispersion slope is also feedback-controlled. Although the disposition order of each compensator is arbitrary, a chromatic dispersion monitor is further needed to monitor the chromatic dispersion of a plurality of channels. This is because the timewise change of chromatic dispersion slope across a plurality of channels must be observed.

Figure 30:
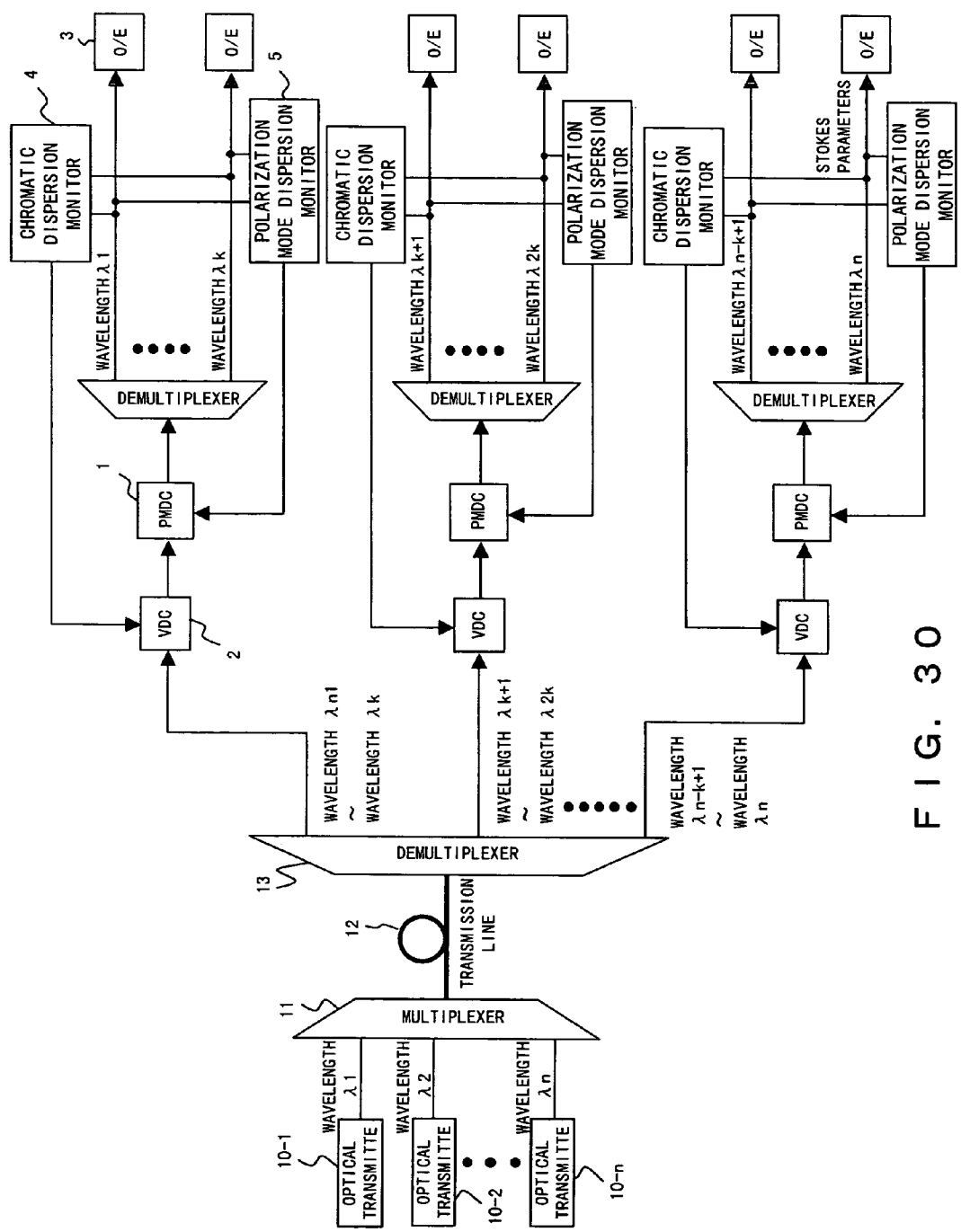
FIG. 30 shows the fifth configuration in which both chromatic dispersion and polarization mode dispersion are collectively compensated.

FIG. 30 shows the fifth configuration in which both chromatic dispersion and polarization mode dispersion are collectively compensated. In FIG. 30, the same reference numerals as those of FIG. 17 are attached to the same components, and their descriptions are omitted.

In this configuration, after demultiplexing, both chromatic dispersion and polarization mode dispersion are collectively compensated for each plurality of channels. As described in the above-mentioned preferred embodiments, if the operation band of a chromatic dispersion compensator (VDC) is narrow, a wavelength-division multiplex light is divided into a plurality of bands, and the chromatic dispersion of optical signals in each divided band are collectively compensated. When dividing an optical signal into a plurality of groups for each band and applying dispersion compensation to each group, there is no need for a chromatic dispersion monitor to always measure the chromatic dispersion of all optical signals in each group, and the observation of one or more wavelengths is sufficient. In this case too, the observation point of the chromatic dispersion monitor must be disposed after a polarization mode dispersion compensator (PMDC).

In this configuration, a variable or fixed chromatic dispersion slope compensator can also be provided, which is not shown in FIG. 30.

In the above-mentioned preferred embodiments or configurations, it is important to dispose a chromatic dispersion monitor after a polarization mode dispersion compensator (PMDC) in order to measure the chromatic dispersion of optical signals whose polarization mode dispersion is compensated. In other words, as described in several flowcharts, when performing chromatic dispersion, it is important to perform chromatic dispersion compensation after performing polarization mode dispersion compensation.

According to the present invention, both chromatic dispersion and polarization mode dispersion, which are problems in high-speed optical communication, can be appropriately compensated.

What is claimed is:

1. A communication system using an optical fiber as a transmission line, comprising:

a polarization mode dispersion compensation unit compensating for polarization mode dispersion from which an optical signal suffers when traveling through the optical fiber;

a polarization mode dispersion measurement unit feeding back information about a state of the polarization mode dispersion from which the optical signal suffers and which is minimally affected by chromatic dispersion, to the polarization mode dispersion compensation unit;

a chromatic dispersion compensation unit compensating for chromatic dispersion from which the optical signal suffers when traveling through the optical fiber; and a chromatic dispersion measurement unit disposed closer to a receiver than the polarization mode dispersion compensation unit, feeding back information about a state of the chromatic dispersion from which the optical signal suffers, to the chromatic dispersion compensation unit, wherein, first, polarization mode dispersion is compensated, second, signal degradation by chromatic dispersion after the polarization mode dispersion is compensated is measured, and lastly, chromatic dispersion is compensated based on the measurement of signal degradation.

2. The system according to claim 1, wherein a Stokes parameter is used for the information about the polarization mode dispersion state.

3. The system according to claim 1, wherein chromatic dispersion is compensated by said chromatic dispersion compensation unit after polarization mode dispersion is compensated by said polarization mode dispersion compensation unit.

4. The system according to claim 1, which is applied to a wavelength-division multiplex communication system.

5. The system according to claim 4, wherein said polarization mode dispersion measurement unit measures polarization mode dispersion of optical signals in each channel, obtained after demultiplexing an optical signal contained in a wavelength-division multiplex light of the wavelength-division multiplex communication system, into a plurality of optical signals for each channel.

6. The system according to claim 4, wherein said chromatic dispersion measurement unit measures chromatic dispersion of one or more channels of an optical signal, obtained after demultiplexing an optical signal contained in a wavelength-division multiplex light of the wavelength-division multiplex communication system, into a plurality of optical signals for each channel.

7. The system according to claim 4, wherein said chromatic dispersion compensation unit collectively compensates for chromatic dispersion of the entire wavelength-division multiplex light.

8. The system according to claim 4, wherein said polarization mode dispersion compensation unit collectively compensates for polarization mode dispersion of the entire wavelength-division multiplex light.

9. The system according to claim 4, wherein said chromatic dispersion compensation unit demultiplexes the wavelength-division multiplex light into a plurality of optical signals, groups the signals and collectively applies chromatic dispersion compensation to each group.

10. The system according to claim 4, wherein said polarization mode dispersion compensation unit applies polarization mode dispersion compensation to each channel of the wavelength-division multiplex light.

11. The system according to claim 1, further comprising a chromatic dispersion slope compensation unit compensating for chromatic dispersion slope.

12. The system according to claim 11, wherein said chromatic dispersion slope compensation unit can change amount of compensation of dispersion slope to be compensated.

13. A method for compensating for polarization mode dispersion and chromatic dispersion in a communication system comprising the polarization mode dispersion compensation unit measuring the state of polarization mode dispersion from which an optical signal suffers when traveling through an optical fiber and compensating for the polarization mode dispersion, and the chromatic dispersion compensation unit in which the measurement point of chromatic dispersion is disposed closer to a receiver than the polarization mode dispersion compensation unit, measuring chromatic dispersion from which the optical signal suffers when traveling through the optical fiber and compensating for the chromatic dispersion, comprising:

compensating for polarization mode dispersion from which the optical signal suffers, by the polarization mode dispersion compensation unit using a polarization state minimally affected by chromatic dispersion; and compensating for chromatic dispersion from which the optical signal suffers by the chromatic dispersion compensation unit after the polarization mode dispersion is compensated, wherein, first, polarization mode dispersion is compensated, second, signal degradation by chromatic dispersion after the polarization mode dispersion is compensated is measured, and lastly, chromatic dispersion is compensated based on the measurement of signal degradation.

14. The method according to claim 13, wherein the state of polarization mode dispersion is expressed by a Stokes parameter.

15. The method according to claim 13, wherein said system is applied to a wavelength-division multiplex communication system.

16. The method according to claim 15, wherein said polarization mode dispersion measurement unit measures polarization mode dispersion of each optical signal in each channel, obtained after demultiplexing an optical signal contained in a wavelength-division multiplex light of the wavelength-division multiplex communication system, into a plurality of optical signals for each channel.

17. The method according to claim 15, wherein said chromatic dispersion measurement unit measures chromatic dispersion of one or more channels of an optical signal, obtained after demultiplexing an optical signal contained in a wavelength-division multiplex light of the wavelength-division multiplex communication system, into a plurality of optical signals for each channel.

18. The method according to claim 15, wherein said chromatic dispersion compensation unit collectively compensates for chromatic dispersion of the entire wavelength-division multiplex light.

19. The method according to claim 15, wherein said polarization mode dispersion compensation unit collectively compensates for polarization mode dispersion of the entire wavelength-division multiplex light.

20. The method according to claim 15, wherein said chromatic dispersion compensation unit demultiplexes the wavelength-division multiplex light into a plurality of optical signals, groups the signals and collectively applies chromatic dispersion compensation to each group.

21. The method according to claim 15, wherein said polarization mode dispersion compensation unit applies polarization mode dispersion compensation to each channel of the wavelength-division multiplex light.

22. The method according to claim 13, further comprising compensating for chromatic dispersion slope.

* * * * *